(12) United States Patent
Matsubara et al.

(10) Patent No.: US 8,080,908 B2
(45) Date of Patent: Dec. 20, 2011

(54) COOLING STRUCTURE FOR ROTOR CORE IN ELECTRIC ROTATING MACHINE

(75) Inventors: Masakatsu Matsubara, Mie (JP);
Yasuo Hirano, Mie (JP); Takashi Hanai, Mie (JP); Motoyasu Mochizuki, Aichi (JP)

(73) Assignees: Kabushiki Kaisha Toshiba, Tokyo (JP);
Toshiba Industrial Products Manufacturing Corporation, Mie-gun (JP)

( * ) Notice: Subject to any disclaimer, the term of this patent is extended or adjusted under 35 U.S.C. 154(b) by 252 days.

(21) Appl. No.: 12/093,057

(22) PCT Filed: Nov. 7, 2006

(86) PCT No.: PCT/JP2006/322160
§ 371 (c)(1),
(2), (4) Date: Jul. 9, 2008

(87) PCT Pub. No.: WO2007/055192
PCT Pub. Date: May 18, 2007

(65) Prior Publication Data
US 2009/0261667 A1    Oct. 22, 2009

(30) Foreign Application Priority Data
Nov. 9, 2005    (JP) .................... 2005-324629

(51) Int. Cl.
*H02K 9/19*    (2006.01)
*H02K 5/20*    (2006.01)
*H02K 9/00*    (2006.01)
*H02K 9/197*    (2006.01)
*H02K 5/04*    (2006.01)

(52) U.S. Cl. ............ 310/61; 310/52; 310/59; 310/60 R; 310/156.53; 310/417

(58) Field of Classification Search ............... 310/52, 310/54, 58, 59, 61, 60 A, 156.53, 60 R, 400, 310/417; H02K 9/16, 5/20, 5/00, 9/00, 9/02, H02K 9/08, 9/10, 9/19, 9/197
See application file for complete search history.

(56) References Cited

U.S. PATENT DOCUMENTS
4,242,610 A * 12/1980 McCarty et al. ......... 310/156.59
(Continued)

FOREIGN PATENT DOCUMENTS
JP    39-032302 Y1    10/1964
(Continued)

*Primary Examiner* — Quyen Leung
*Assistant Examiner* — Michael Andrews
(74) *Attorney, Agent, or Firm* — Foley & Lardner LLP

(57) ABSTRACT

A rotor for an electric rotating machine includes d-axis through holes located on respective d-axes, hollow shafts formed in both axial sides of a rotating shaft not inserted into a rotor core, presser plates mounted on both axial ends of the rotor core, cooling grooves formed in faces of the presser plates in contact with the rotor core, a plurality of presser plate refrigerant outlet holes in the presser plates, the presser plate refrigerant outlet holes of one of the presser plates having diameters different from diameters of the presser plate refrigerant outlet holes of one of the other presser plates, and a refrigerant channel formed so that a refrigerant supplied into one of the hollow shafts of the rotating shaft flows through the refrigerant channel and further through the hollow shaft wall hole of said one hollow shaft and the radial grooves of the respective presser plates.

9 Claims, 25 Drawing Sheets

U.S. PATENT DOCUMENTS

2004/0164627 A1 * 8/2004 Tornquist et al. ............... 310/59

FOREIGN PATENT DOCUMENTS

| | | | |
|---|---|---|---|
| JP | 8-336250 | A | 12/1996 |
| JP | 08336250 | A * | 12/1996 |
| JP | 9-163682 | A | 6/1997 |
| JP | 11-113201 | A | 4/1999 |
| JP | 2000-125527 | A | 4/2000 |
| JP | 2001-161041 | A | 6/2001 |
| JP | 2002-078291 | A | 3/2002 |
| JP | 2002-325394 | A | 11/2002 |
| JP | 2002-345188 | A | 11/2002 |
| JP | 2002325394 | A * | 11/2002 |
| JP | 2005-086955 | | 3/2005 |
| JP | 2005-184957 | A | 7/2005 |
| JP | 2005184957 | A * | 7/2005 |

* cited by examiner

COOLING STRUCTURE FOR ROTOR CORE IN ELECTRIC ROTATING MACHINE

TECHNICAL FIELD

The present invention relates to an electric rotating machine using a permanent magnet, and more particularly to a rotor for such an electric rotating machine in which the permanent magnet and a rotor core can be cooled by a refrigerant, and the electric rotating machine provided with the rotor.

BACKGROUND ART

Recent electric rotating machines have been reduced in size by employment of a structure of embedding a permanent magnet in a rotor, a technique of utilizing reluctance torque by giving a magnetically salient polarity to a rotor as well as magnetic torque, and the like. One of present problems to be overcome is considered to increase a rotational speed of a rotor.

However, an iron loss (the sum of hysteresis loss and eddy current loss) induced in a rotor core is increased and particularly an iron loss induced near a surface of the iron core is increased when the rotational speed is increased. Furthermore, an eddy current loss induced in a permanent magnet embedded in a rotor core is not negligible, either. When heat generation due to these losses increases a temperature of the permanent magnet, the permanent magnet is demagnetized such that induced torque is reduced. Additionally, an increase in a temperature of the rotor core also reduces magnetic permeability of the core thereby to reduce the induced torque.

Various structures for cooling the rotor have conventionally been proposed for the purpose of suppressing a temperature increase in the rotor. For example, Patent Document 1 proposes a cooling structure in which cavities are formed so as to axially extend through a rotor core and openings are formed in both presser plates of the rotor core located opposite the cavities respectively. Partition plates which are longer than an axial dimension of the rotor are mounted in the cavities and the openings respectively. In the structure, however, the cooling performance is low since cooling by air is employed.

Furthermore, Patent Document 2 proposes a cooling structure in which cooling channels are formed on inner peripheral sides of embedded permanent magnets so as to extend through the rotor core. Each cooling channel has a section formed to be convex in a direction of the rotation center. A refrigerant is adapted to be caused to flow through the cooling channels. This structure would be insufficient in the performance to cool a rotor core although effective for the cooling of permanent magnets.

Patent Document 1; JP-A-2002-78291
Patent Document 2: JP-A-2002-345188

DISCLOSURE OF THE INVENTION

Problem to be Overcome by the Invention

The present invention was made to overcome the foregoing problems of the conventional technique, and the subject matter thereof is to facilitate high speed and size reduction in the electric rotating machine by improving the cooling performance for the rotor thereof.

Means for Overcoming the Problem

The present invention provides a rotor for an electric rotating machine, comprising a plurality of permanent magnets embedded in a plurality of magnet insertion holes axially extending through a circumference of a cylindrical rotor core respectively, each permanent magnet embedded in the magnet insertion hole having both lengthwise ends of a section thereof, said lengthwise ends having respective voids formed by expanding the magnetic insertion hole so that the voids extend axially through the rotor core; a rotating shaft which extends through a central portion of the of the rotor core thereby to be fixed; a plurality of d-axis through holes that is provided on respective d-axes corresponding to a direction of magnetic flux so as to extend through the rotor core in an axial direction in an outer circumferential side relative to the embedded permanent magnets; a plurality of hollow shafts which is formed in both axial sides of the rotating shaft not inserted into the rotor core, the hollow shafts having hollow shaft wall holes formed in hollow shaft walls of the hollow shafts at both sides of the rotating shaft so as to radially extend through the hollow shafts respectively; a plurality of presser plates which is mounted on both axial ends of the rotor core so as to hold the rotor core therebetween; a plurality of cooling grooves which is formed in faces of the presser plates in contact with the rotor core so as to connect the hollow shaft wall holes, the d-axis through holes and the voids respectively, the cooling grooves including first annular grooves provided in the respective presser plates and connecting the respective d-axis through holes and second annular grooves provided in the respective presser plates and connecting the respective voids, and radial grooves provided in the respective presser plates and connecting the first and second annular grooves and the hollow shaft wall holes; a plurality of presser plate refrigerant outlet holes formed in the presser plates, the presser plate refrigerant outlet holes of one of the presser plates having diameters different from diameters of the presser plate refrigerant outlet holes of one of the other presser plates; and a refrigerant channel which is formed so that a refrigerant supplied into one of the hollow shafts of the rotating shaft flows through the refrigerant channel and further through the hollow shaft wall hole of said one hollow shaft and the radial grooves of the respective presser plates, into a flow path including the first annular grooves of the presser plate, the d-axis through holes of the rotor core and the first annular grooves of the oppositely located presser plate and into a flow path including the second annular grooves of the presser plate, the voids of the rotor core and second annular grooves of the oppositely located presser plate, the refrigerant flowing into the radial grooves of the respective presser plates including part thereof discharged through the refrigerant outlet holes of said one of the presser plates and a remaining part thereof discharged through the refrigerant outlet holes of said other presser plate.

EFFECT OF THE INVENTION

In the rotor for an electric rotating machine and the electric rotating machine of the invention, when the rotor is thus constructed and refrigerant is caused to flow from the hollow shaft of the rotating shaft, the rotor is cooled such that temperature increase thereof can be suppressed. Since the refrigerant flows through the d-axis through holes provided near the rotor core particularly in the construction, a surface layer of the rotor core and the permanent magnets can effectively be cooled. Accordingly, a reduction in the developed torque can be avoided since the temperature increase in the permanent magnets can be suppressed and the demagnetization can be prevented.

BEST MODE FOR CARRYING OUT THE INVENTION

Figure 1:
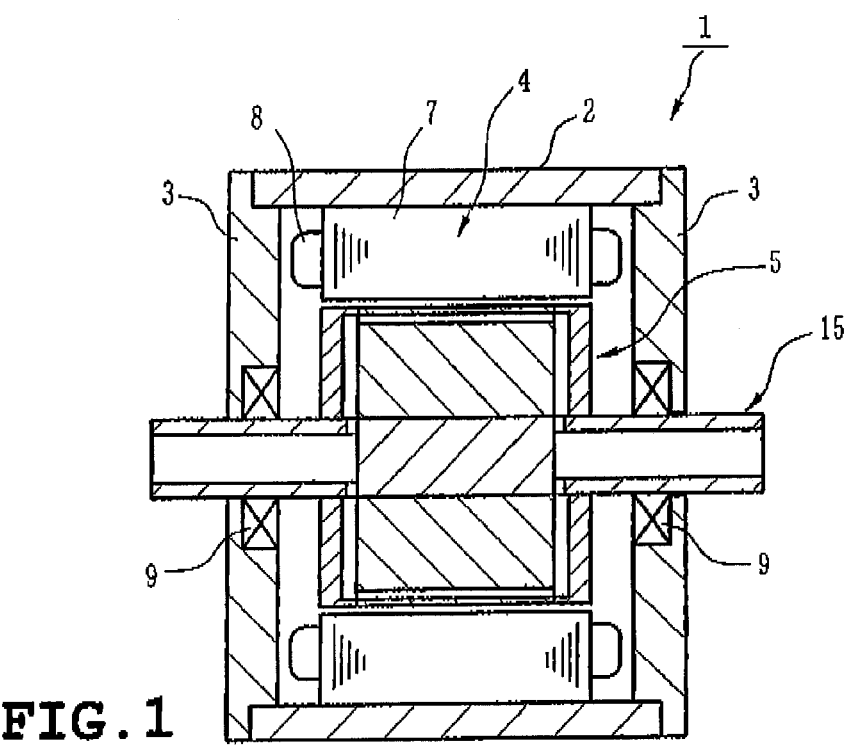
FIG. 1 is a longitudinal side section of an electric rotating machine 1 of the invention.

A rotor for an electric rotating machine and an electric rotating machine of the present invention will be described with reference to the drawings. FIG. 1 shows the construction of an electric rotating machine 1 of the invention in a longitudinal section. The electric rotating machine 1 comprises a cylindrical metal frame 2, bearing brackets 3 mounted on both end faces of the frame 2, a stator 4 and a rotor 5.

The stator 4 comprises a stator core 7 and a stator winding 8. The stator core 7 is formed by punching out a magnetic material such a silicon steel sheet into a generally annular shape, whereby a core piece is obtained. A plurality of core pieces is stacked into the stator core 7. The stator winding 8 is housed in the stator core 7. The stator 4 is fitted in a cylindrical frame 2. The frame 2 has both end faces to which bearing brackets 3 are fastened by bolts and nuts respectively. Bearings 9 are mounted on central portions of the both bearing brackets 3 respectively. The rotor 5 is rotatably held by the bearings 9 inside the stator 4.

Figure 2:
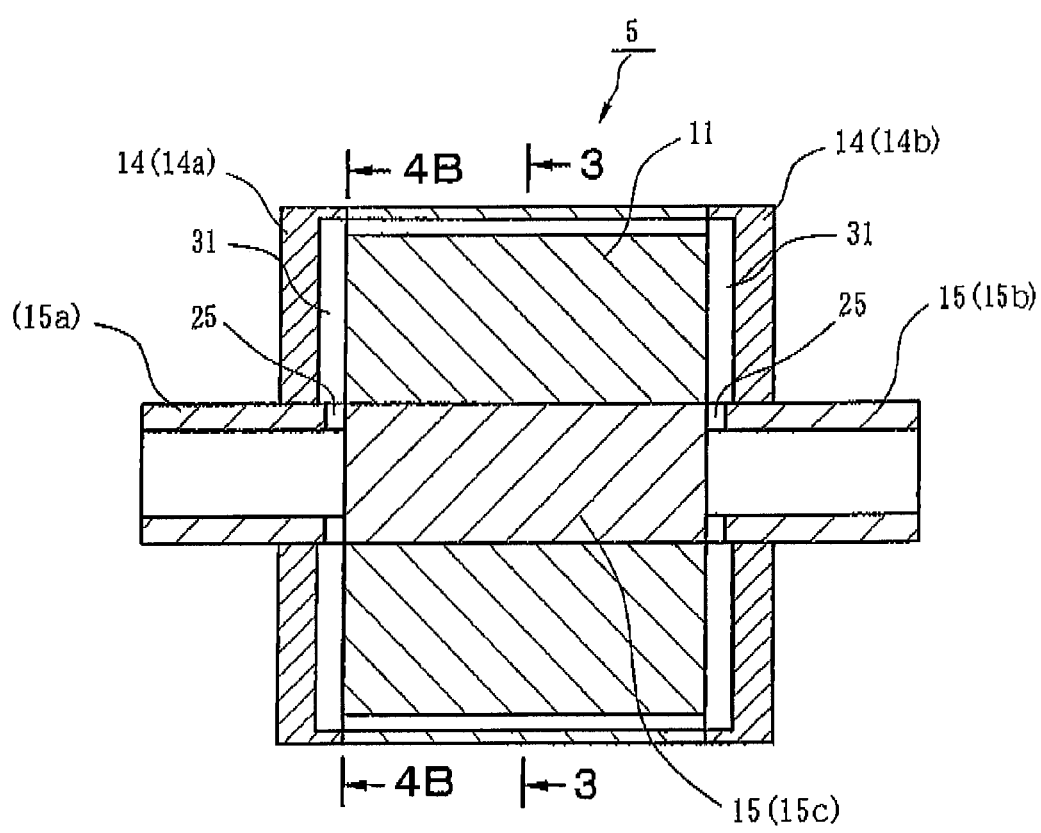
FIG. 2 is a longitudinal side section of the electric rotating machine including a d-axis of a rotor 5 of a first embodiment.
Figure 3:
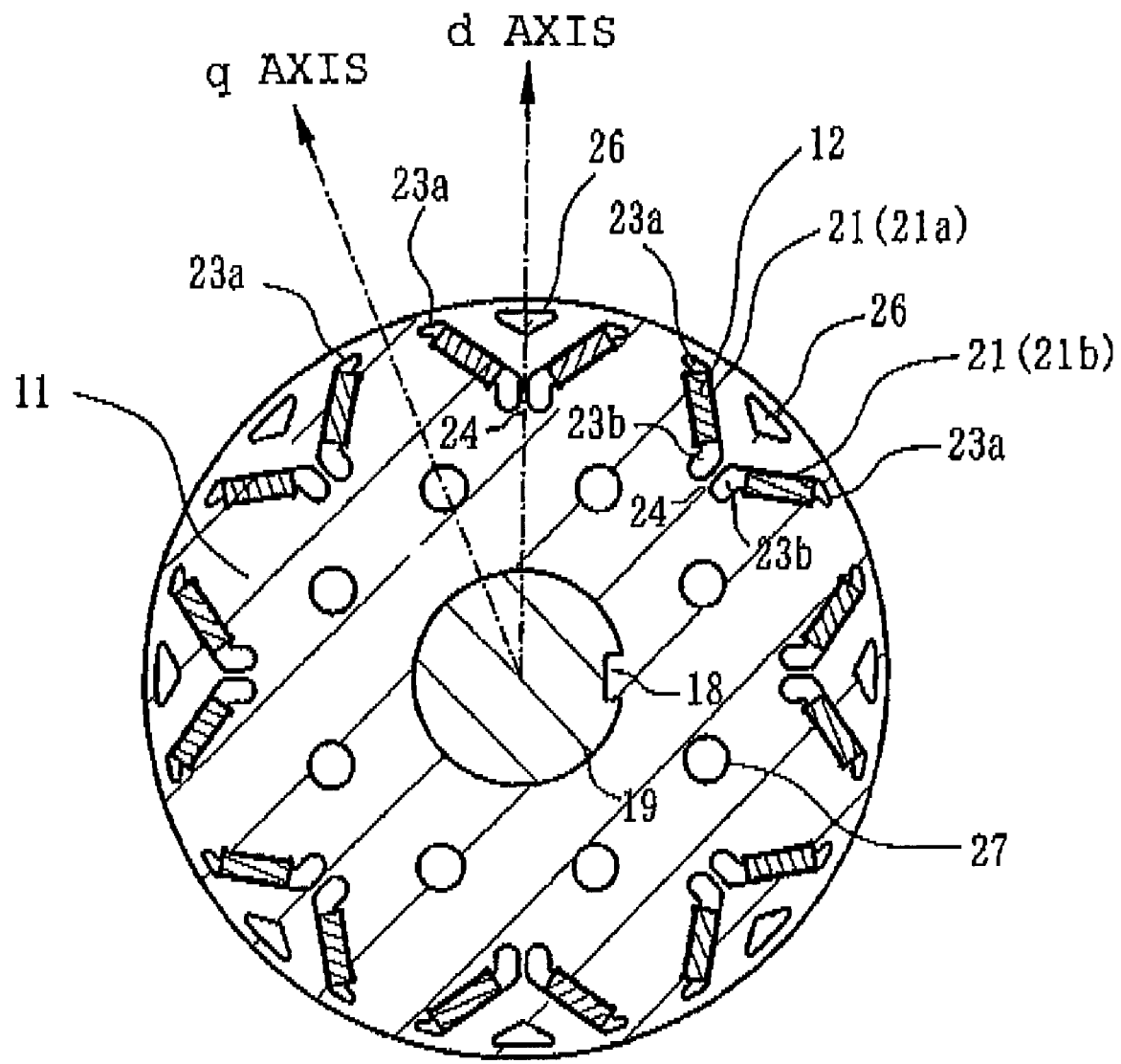
FIG. 3 is a sectional view taken along line perpendicular to the axis of the rotor in accordance with the invention.

FIG. 2 is a longitudinal side section of the electric rotating machine including a d-axis of the rotor 5 of a first embodiment. The rotor 5 comprises a rotor core 11, permanent magnets 12 (see FIG. 3) embedded in the rotor core 11, two presser plates 14a and 14b pressing both end faces of the rotor core 11 respectively, and a rotating shaft 15. FIG. 3 is a sectional view of the rotor 5 taken along line 3-3 in FIG. 2. The rotor core 11 is formed by punching out a magnetic material into a planar shape as shown in FIG. 3, whereby a core piece is obtained. A plurality of the core pieces is stacked and axially crimped. The rotating shaft 15 is rotatably fitted in a hole 19 having a central key 18 of the rotor core 11.

The rotor 5 of the embodiment is a permanent magnet embedded type. A plurality of magnet insertion holes 21 through which the permanent magnets 12 are embedded is provided in a circumference of the rotor core 11. FIG. 3 shows the case where the number of poles is 8. Magnet insertion holes 21 for one pole comprise two magnet insertion holes 21a and 21b disposed in a V shape as viewed at the rotating shaft 15 side. The magnet insertion holes 21 are provided so as to axially run through the rotor core 11. Plate-shaped permanent magnets 12 are embedded in the magnet insertion holes 21 respectively. The permanent magnets 12 embedded in the magnet insertion holes 21a and 21b and facing the outer circumferential side of the rotor core 11 are magnetized so as to have the same polarity as but the different polarity from the permanent magnets 12 embedded in the neighbor V-shaped magnet insertion holes 21. Voids 23a and 23b are formed in both lengthwise sides of each embedded permanent magnet 12 by expanding the magnet insertion holes 21a and 21b respectively. Although a primary purpose of provision of the voids 23a and 23b resides in preventing flux short-circuit, the voids 23a and 23b are also used as a refrigerant channel in the invention as will be described latter.

Of the voids located at both sides of the magnet, the void 23a located at the outer circumference side is formed near an outer circumferential face of the rotor core 11. The other voids 23b adjacent to each other are formed with a slight gap therebetween, A core in the gap connects a core located at the outer circumferential side relative to the V-shaped magnet insertion hole 21 to the inner circumferential side core. Accordingly, the core is called "bridge" 24.

The magnet insertion holes 21a and 21b are formed so as to be line-symmetric with respect to a line connecting the bridge 24 and the rotating shaft and a shaft center of the rotating shaft 15. Accordingly, magnetic flux produced by the V-shaped permanent magnets 12 is directed to a line connecting the bridge 24 and the shaft center of the rotating shaft 15 at the V-shaped portion. In a d-q coordinate system known in a biaxial theory, the direction of magnetic flux produced by the permanent magnet is called "d-axis." In the rotor 5 of the embodiment, the line connecting the bridge 24 and the shaft center of the rotating shaft 15 corresponds to the d-axis.

In the rotor 5 as shown in FIG. 3, d-axis through-holes 26 are provided so as to be located on the d-axes respectively and at the outer circumferential side relative to the permanent magnets and so as to run through the rotor core 11. The d-axis through-holes 26 increase magnetic resistance in the d-axis direction and decrease a d-axis inductance Ld. Consequently, the difference between a q-axis inductance Lq and the d-axis inductance Ld is increased such that reluctance torque is increased. Furthermore, at the same time, since the mass of the iron core located at the outer circumferential side relative to the V-shaped magnet insertion hole 21 is reduced, a centrifugal force exerted on this part is reduced whereupon high speed rotation can be realized. Although a primary purpose of provision of the d-axis through-holes 26 resides in the foregoing point, the d-axis through-holes 26 are also used as a refrigerant channel in the invention as will be described later.

A direction with phase lead of π/2 by electrical angle is called "q-axis" in a dq coordinate system. In the rotor 5 shown in FIG. 3, a q-axis is represented by a line connecting the line between the adjacent two voids 23a of the adjacent V-shaped magnet insertion holes 21 and the shaft center of the rotating shaft 15. The rotor 5 of the embodiment has q-axis through-holes 27 which are formed on the q-axes so as to axially extend through the rotor core 11. Although the q-axis through-holes 27 contribute to an improvement in responsiveness to rotational speed changes by weight saving, the q-axis through-holes are used as the refrigerant channel in the invention as will be described later.

Figure 4A:
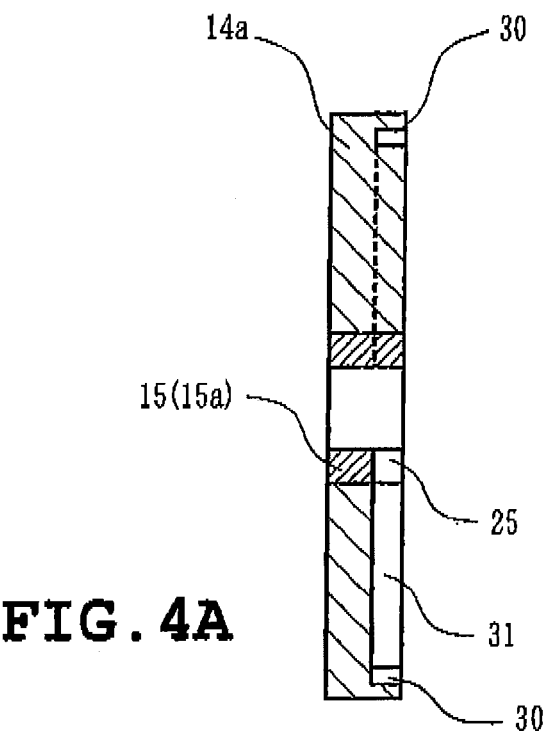
FIG. 4A is a sectional view taken along line 4A-4A in FIG. 4B.
Figure 4B:
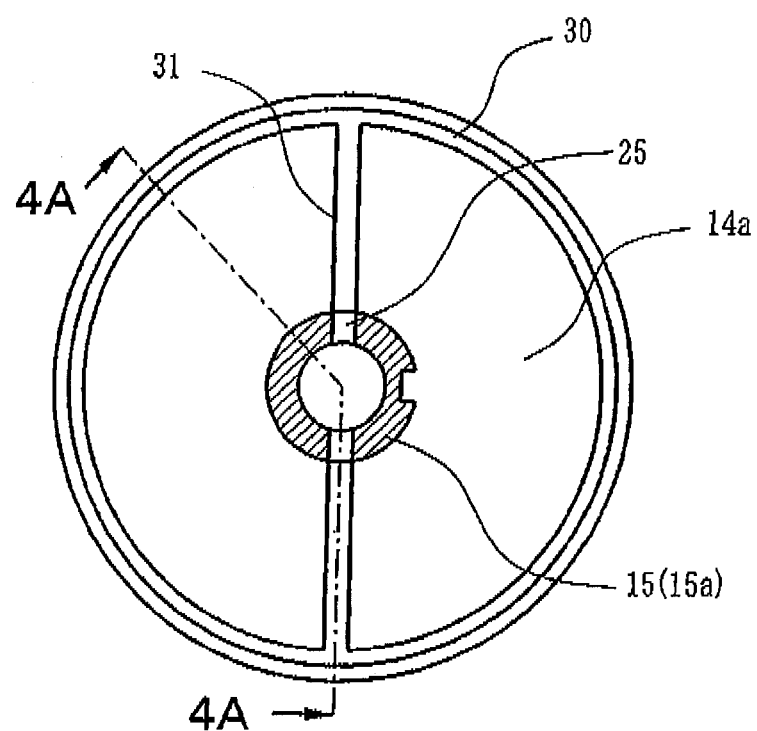
FIG. 4B is a front view of a left presser plate 14a pressing a rotor core 11 of the rotor 5 in the first embodiment.

FIGS. 4A and 4B illustrate an outer configuration of the left presser plate 14a pressing the rotor core 11 as shown in FIG. 2 together with a sectional configuration of the rotating shaft 15 extending through the left presser plate 14a. FIG. 4B is a view of a joint surface of the left presser plate 14a and the rotor core 11 (a plane perpendicular to the shaft center including the line 4B-4B in FIG. 2) as viewed from the rotor core 11 side. FIG. 4A is a sectional view taken along line 4A-4A in FIG. 42. The left presser plate 14a has a surface which is in contact with the rotor core 11 and is formed with two grooves each having a U-shaped section. The rotating shaft 15 is inserted through and fixed in the center of the left presser plate 14a.

The rotating shaft 15 includes hollow shaft portions 15a and 15b and a solid shaft portion 15c as shown in FIG. 2. A part of the rotating shaft 15 inserted through and fixed in the rotor core 11 is formed in the solid shaft portion 15c and parts protruding at both sides of the rotor core 11 are formed in the hollow shaft portions 15a and 15b respectively. A hollow shaft wall hole 25 radially extending is formed in a wall face of the hollow shaft portion 15a so as to be located between the solid shaft portion 15c and the hollow shaft portion 15a as shown in FIG. 2.

First annular grooves 30 are formed annularly along the circumferences of the presser plates 14a and 14b respectively. The first annular grooves 30 are formed at locations where the grooves 30 are connected to the d-axis through-holes 26, respectively. Radial grooves 31 are formed in the presser plates 14a and 14b so as to connect the first annular grooves 30 to the hollow shaft wall holes 25 of the rotating shaft 15 respectively. Although two radial grooves 31 and two hollow shaft wall holes 25 are formed as shown in FIGS. 4A and 4B, the numbers of the grooves 31 and holes 25 may be increased. The right presser plate 14b pressing the rotor core 11 from the right of the rotor core 11 and the hollow shaft portion 15b are formed so as to be plane-symmetric with the left presser plate 14a and the hollow shaft portion 15a respectively.

The left and right presser plates 14a and 14b are mounted with the grooved faces being pressed against the rotor core 11. A plurality of d-axis through-holes 26 provided in the rotor core 11 are connected by the first annular groves 30 formed in the presser plates 14a and 14b respectively. The first annular grooves 30 are connected through the radial grooves 31 and the hollow shaft wall holes 25 of the rotating shaft 30 of the rotating shaft 15 to the inside of the hollow shaft portion 15a of the rotating shaft 15. Consequently, a channel is formed from the inside of the left hollow shaft portion 15a of the rotating shaft 15 to the inside of the right hollow shaft portion 15a.

Figure 5:
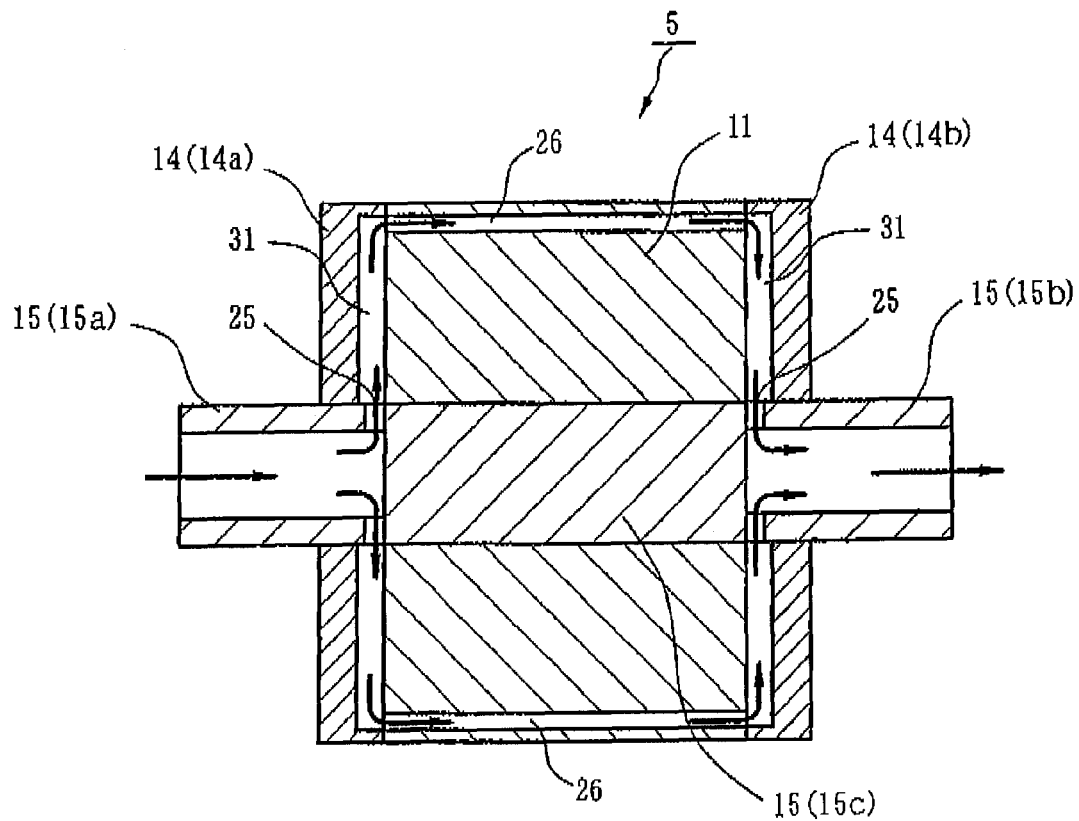
FIG. 5 is a view explaining flow channels in the case where a refrigerant is caused to flow through the rotor 5 in the first embodiment.

Accordingly, when being poured into the left hollow shaft portion 15a of the rotating shaft 15 as shown in FIG. 5, refrigerant flows out of the rotor core 11 through the hollow shaft wall hole 25 of the left hollow shaft portion 15a, the radial groove 31 of the left presser plate 14a, the first annular groove 30, the d-axis through-hole 26 of the rotor core 11, the first annular groove 30 of the right presser plate 14b, the radial groove 31, the hollow shaft wall hole 25 of the right hollow shaft portion 15a and the inside of the right hollow shaft portion 15b as shown by arrows in FIG. 5.

The rotating machine 1 of the embodiment as shown in FIG. 1 employs the rotor 5 with the refrigerant channel configured as described above, and the refrigerant is caused to flow through the refrigerant channel so that the rotor 5 is cooled. As the refrigerant is used oil, water mixed with antiseptic agent, other liquid, cooling air or the like.

When the refrigerant is caused to flow through the refrigerant channel provided in the rotor 5, the rotor 5 is cooled such that the temperature increase can be suppressed. Particularly in the rotor 5 of the embodiment, the surface of the rotor core 11 and the permanent magnets 12 are effectively cooled since the refrigerant flows through the d-axis through-holes provided near the circumference of the rotor core 11. Accordingly, since the temperature increase in the permanent magnets is suppressed and accordingly, the permanent magnets are prevented from demagnetization, a reduction in the developed torque can be avoided. Furthermore, the temperature increase in the rotor 5 due to iron loss is suppressed in the rotating machine 1 provided with the rotor 5 configured as described above. Accordingly, higher speed operation can be realized and the size of the rotating machine 1 can be reduced.

Furthermore, each magnet insertion hole 21 in which the permanent magnet is embedded is divided into two parts centrally along the d-axis. The bridge 24 is formed between the divided parts so as to connect the outer circumferential side relative to the magnet insertion holes 21 of the rotor core 11 and the inner circumferential side, and the divided magnet insertion holes 21 are disposed into the V-shape. Consequently, the rotor 5 of the rotating machine 1 can withstand a centrifugal force during high speed rotation, and accordingly, the rotor 5 of the embodiment can be employed in a rotating machine which necessitates higher speed rotation.

Figure 6:
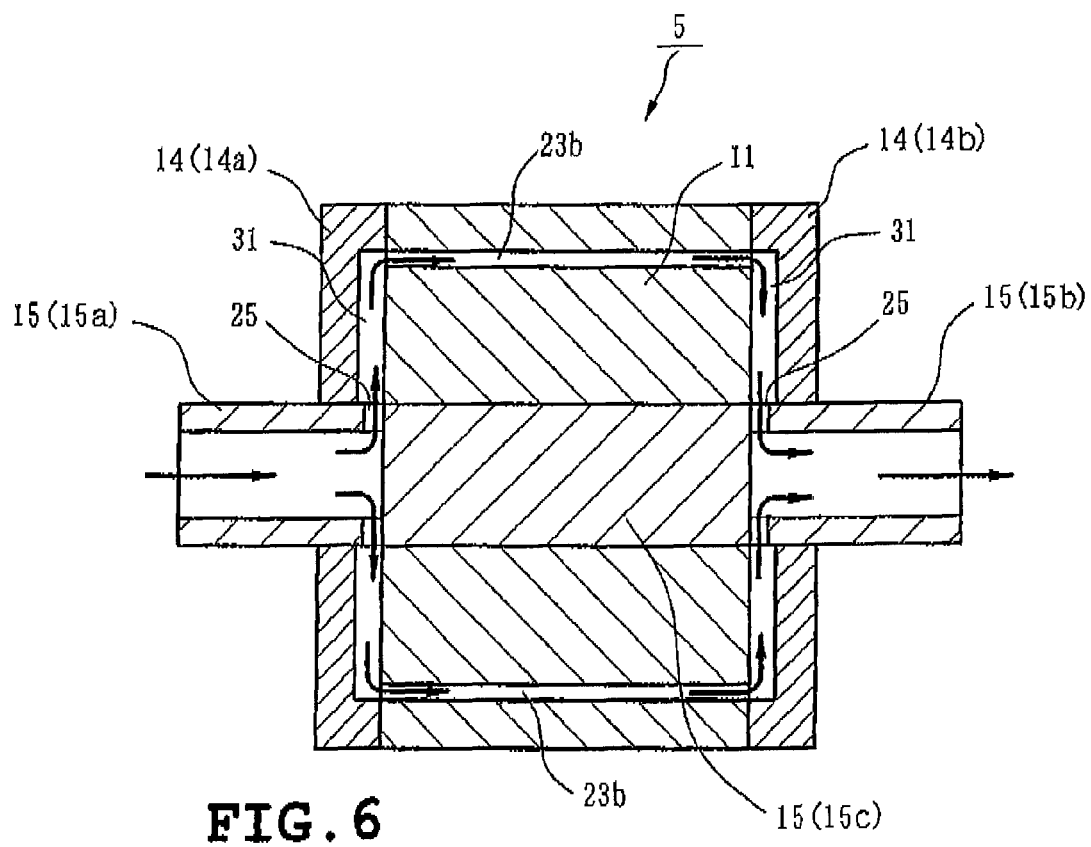
FIG. 6 is a view similar to FIG. 5, showing the rotor 5 in a second embodiment.
Figure 7A:
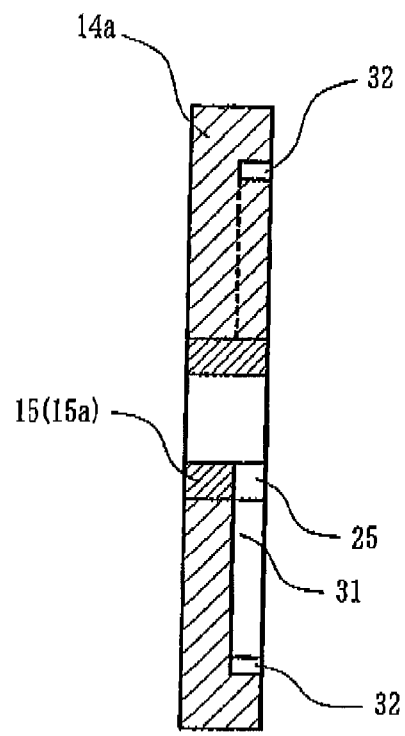
FIG. 7A is a sectional view taken along line 7A-7A in FIG. 7B.
Figure 7B:
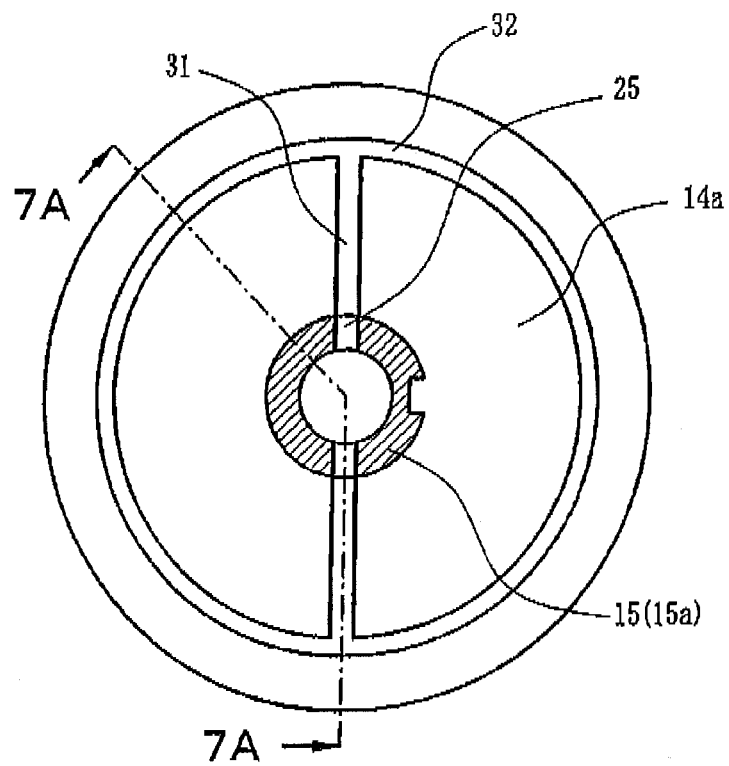
FIG. 7B is a view similar to FIG. 4b, showing the rotor 5 in the second embodiment.

A second embodiment of the invention will be described with reference to FIGS. 6, 7A and 7B. In these figures, identical or similar parts are labeled by the same reference symbols as those in FIGS. 2 to 5 of the first embodiment. FIG. 6 is a longitudinal section of the rotor 5 of the embodiment. FIGS. 7A and 7B illustrate an outer configuration of the left presser plate 14a pressing the rotor core 11 together with a sectional configuration of the rotating shaft 15 extending through the left presser plate 14a. FIG. 7B is a view of a joint surface of the left presser plate 14a and the rotor core 11 as viewed from the rotor core 11 side. FIG. 7A is a sectional view taken along line 7A-7A in FIG. 7B. The right presser plate 14b is formed so as to be plane-symmetric with the left presser plate 14a.

The rotor 5 of the embodiment differs from the rotor 5 of the first embodiment as shown in FIG. 5 in locations of the annular grooves formed in the faces of the left and right presser plates 14a and 14b in contact with the rotor core 11. In the case of the left presser plate 14a of the first embodiment as shown in FIGS. 4A and 4B, the first annular groove 30 is formed at a location where the groove 30 connects the d-axis through-holes 26 of the rotor core 11. On the other hand, a second annular groove 32 of the second embodiment is formed so as to connect the voids 23b formed by expanding the magnet insertion holes 21a and 21b axially running through. The radial groove 31 is formed so as to connect the second annular groove 32 to the hollow shaft wall hole 25 of the rotating shaft 15.

Accordingly, when caused to flow into the left hollow shaft portion 15a of the rotating shaft 15 as shown in FIG. 6, refrigerant flows through the voids 23b in the rotor core 11, instead of the d-axis through-holes 26, thereby flowing out of the rotor core 11 through the right hollow shaft portion 15a at the opposite side.

In the second embodiment, when poured into the left hollow shaft portion 15a, the refrigerant flows into the voids 23b axially running through the rotor core 11 in contact with the permanent magnets 12. Accordingly, the permanent magnets 12 are cooled further effectively. Consequently, since the temperature increase of the permanent magnets is suppressed, the permanent magnets are prevented from demagnetization, whereupon reduction in the developed torque can be avoided.

Figure 8:
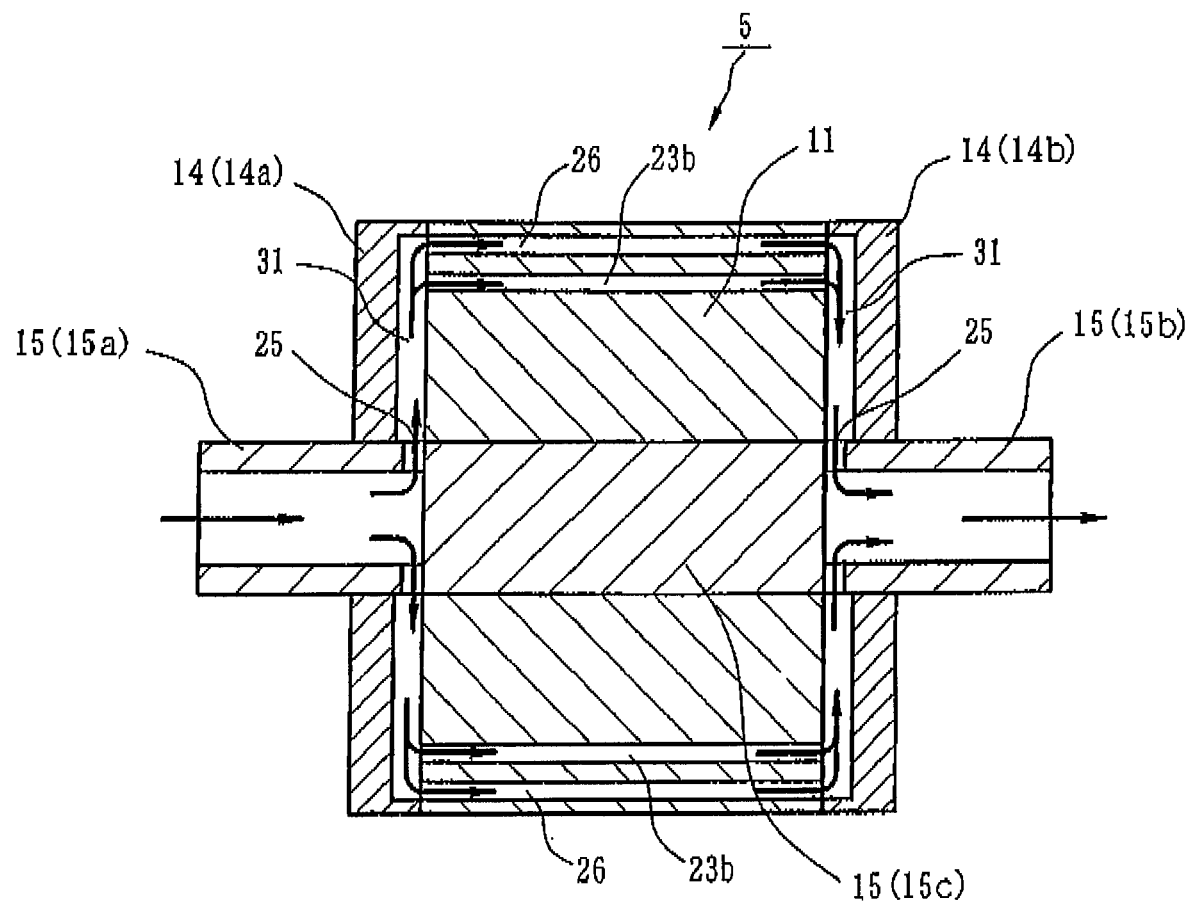
FIG. 8 is a view similar to FIG. 5, showing the rotor 5 in a third embodiment.
Figure 9A:
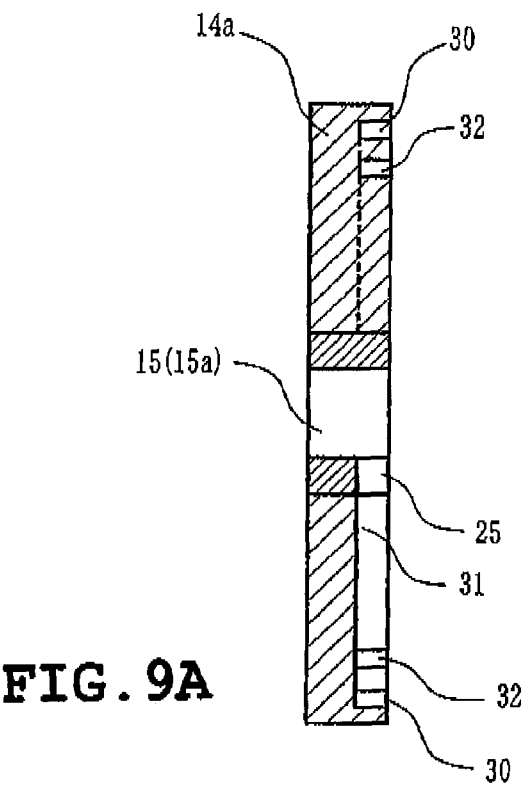
FIG. 9A is a sectional view taken along line 9A-9A in FIG. 9B.
Figure 9B:
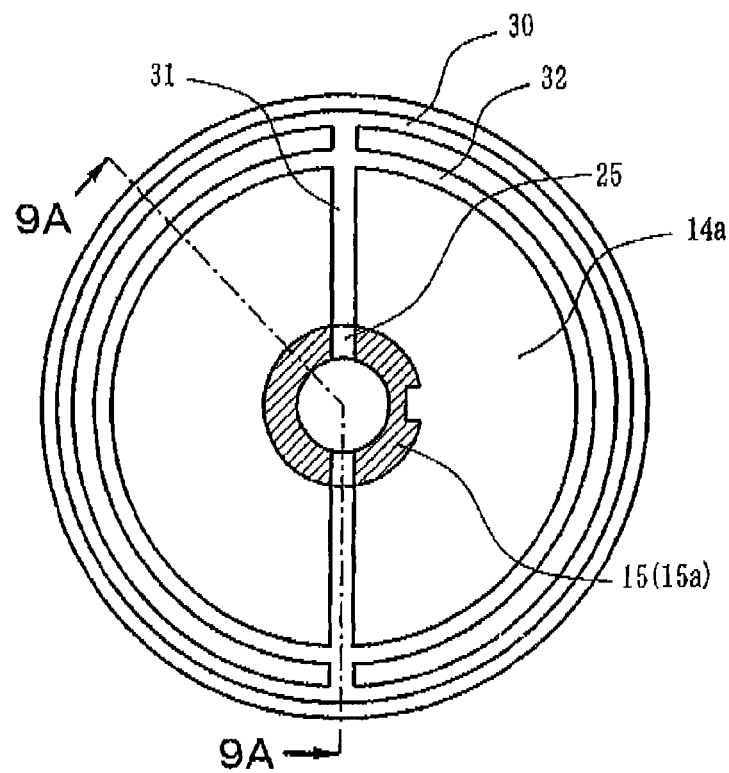
FIG. 9B is a view similar to FIG. 4B, showing the rotor 5 in the fourth embodiment.

A third embodiment of the invention will be described with reference to FIGS. 8, 9A and 9B. In these figures, identical or similar parts are labeled by the same reference symbols as those in FIGS. 2 to 5 of the first embodiment. FIG. 8 is a longitudinal section of the rotor 5 of the embodiment. FIGS. 9A and 9B illustrate an outer configuration of the left presser plate 14a pressing the rotor core 11 together with a sectional configuration of the rotating shaft 15 extending through the left presser plate 14a. FIG. 9B is a view of a joint surface of the left presser plate 14a and the rotor core 11 as viewed from the rotor core 11 side. FIG. 9A is a sectional view taken along line 9A-9A in FIG. 9B. The right presser plate 14b is formed so as to be plane-symmetric with the left presser plate 14a.

The rotor 5 of the embodiment differs from the rotors 5 of the first and second embodiments in the construction of the annular grooves formed in the faces of the left and right presser plates 14a and 14b in contact with the rotor core 11. The third embodiment is provided with both first annular groove 30 provided in the first embodiment and second annular groove 32 provided in the second embodiment. The first annular groove 30 connects the plural d-axis through-holes 26 provided in the rotor core 11, and the second annular groove 32 connects the voids 23b formed by expanding the magnet insertion holes 21a and 21b so as to axially run through the rotor core 11.

Furthermore, of the voids 23 formed by expanding the magnet insertion holes 21a and 21b, the void 23a located at the outer circumferential side of the rotor core 11 has substantially the same distance from the shaft center of the rotor core 11 as the d-axis through hole 26. Accordingly, the first annular groove 30 has a width adjusted so as to connect the voids 23a as well as the d-axis through-holes 26. The radial grooves 31 are formed so as to connect the first and second annular grooves to the hollow shaft wall holes 25 of the rotating shaft 15.

Accordingly, when poured into the left hollow shaft portion 15a of the rotating shaft 15 as shown in FIG. 8, the refrigerant passes through three types of through-holes, that is, the d-axis through-holes 26r voids 23a and voids 23b in parallel in the rotor core 11. After having passed through these through-holes, the refrigerant then flows out of the rotor core 11 through the right hollow shaft portion 15a at the opposite side.

In the third embodiment, when poured into the left hollow shaft portion 15a, the refrigerant flows through the three types of through-holes, that is, the d-axis through-holes 26, voids 23a, voids 23b in the rotor core 11. Accordingly, since the permanent magnets 12 and the rotor core 11 are cooled further effectively, reduction in the developed torque can be avoided.

Figure 10:
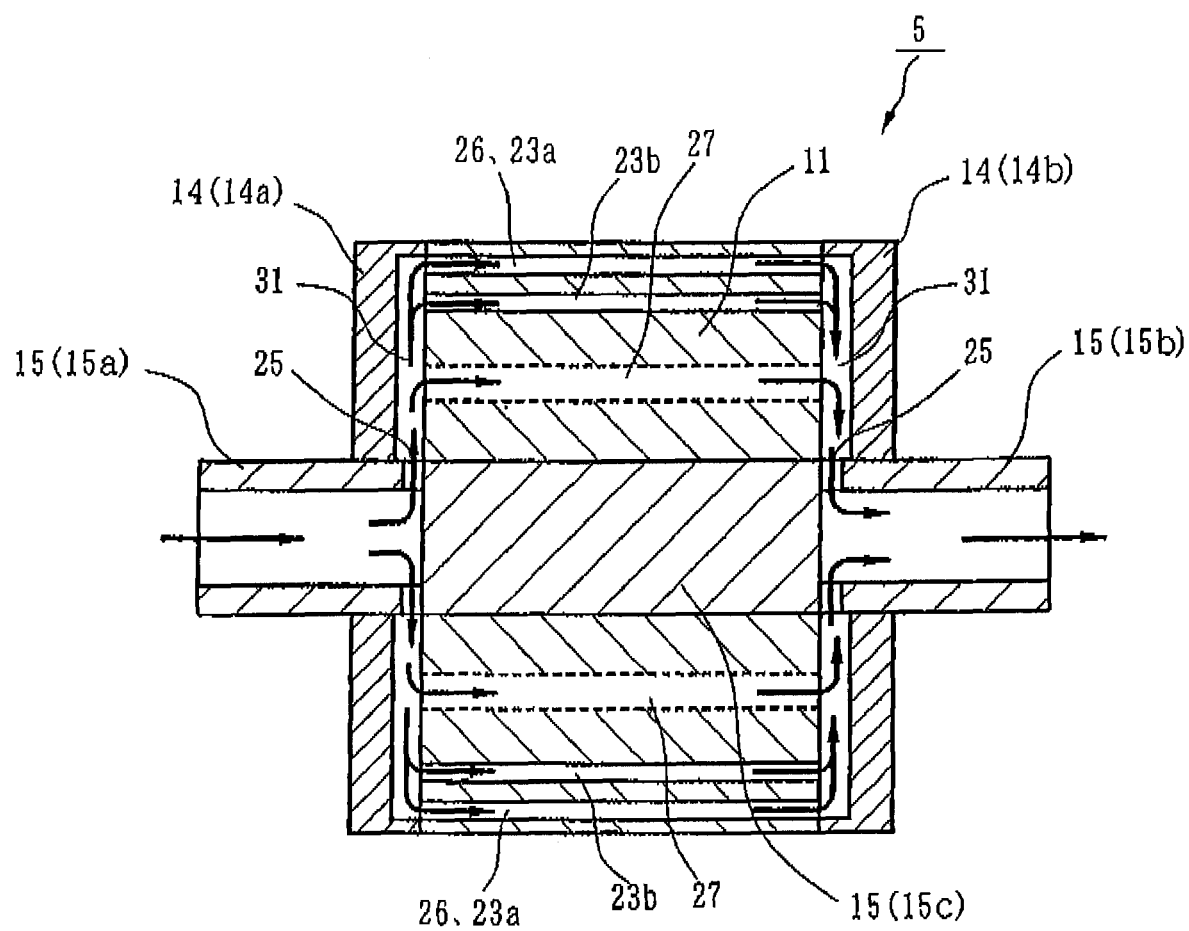
FIG. 10 is a view similar to FIG. 5, showing the rotor 5 of a fourth embodiment.
Figure 11A:
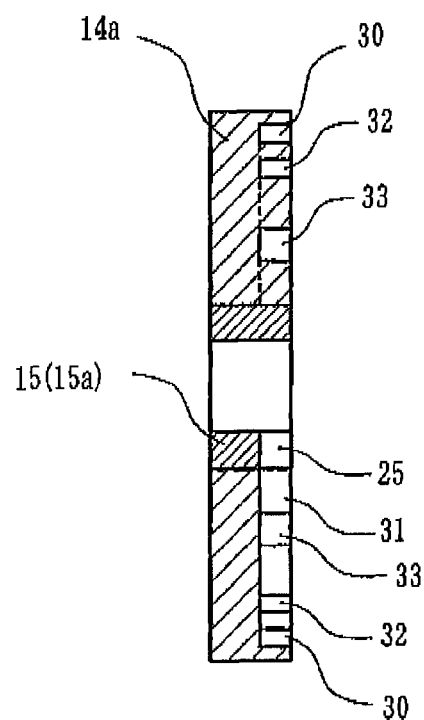
FIG. 11A is a sectional view taken along line 11A-11A in FIG. 11B.
Figure 11B:
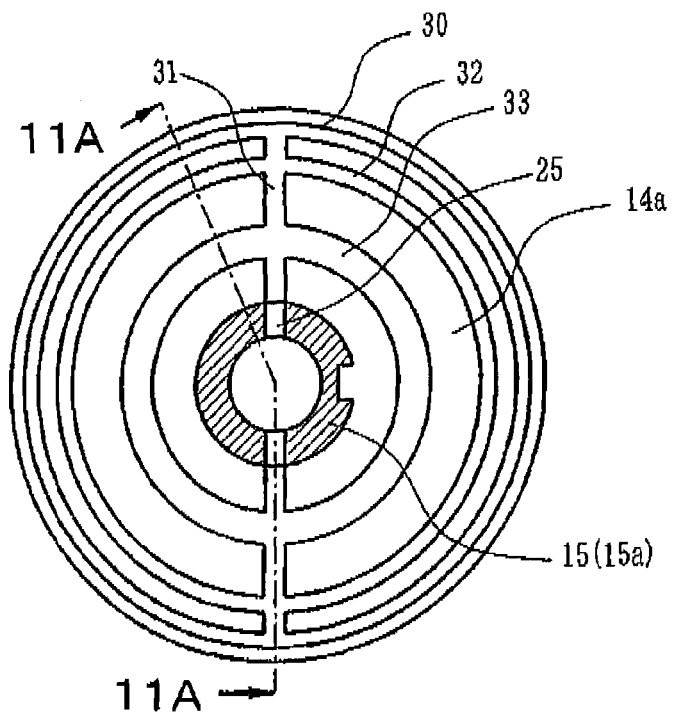
FIG. 11B is view similar to FIG. 4B, showing the rotor 5 of the fourth embodiment.

A fourth embodiment of the invention will be described with reference to FIGS. 10, 11A and 11B. In these figures, identical or similar parts are labeled by the same reference symbols as those in FIGS. 8, 9A and 9B of the third embodiment. FIG. 10 is a longitudinal section of the rotor 5 of the embodiment. FIGS. 11A and 11B illustrate an outer configuration of the left presser plate 14a pressing the rotor core 11 together with a sectional configuration of the rotating shaft 15 extending through the left presser plate 14a. FIG. 11B is a view of a joint surface of the left presser plate 14a and the rotor core 11 as viewed from the rotor core 11 side. FIG. 11A is a sectional view taken along line 11A-11A in FIG. 11B. The right presser plate 14b is formed so as to be plane-symmetric with the left presser plate 14a.

The rotor 5 of the embodiment differs from the rotor 5 of the third embodiment in the construction of the annular grooves formed in the faces of the left and right presser plates 14a and 14b in contact with the rotor core 11. The fourth embodiment is provided with third annular grooves 33 in addition to the first and second annular grooves 30 and 32 provided in the third embodiment. The third annular grooves 33 are formed so as to connect the q-axis through-holes 27 described with reference to FIG. 3. More specifically, in the fourth embodiment, the d-axis through-holes 26 and the voids 23a are connected by the first annular grooves 30. The voids 23b are connected by the second annular grooves 32. The q-axis through-holes 27 are connected by the third annular grooves 33. The radial grooves 31 are formed so as to connect the first, second and third annular grooves 30, 32 and 33 to the hollow shaft wall holes 25 of the rotating shaft 15.

Accordingly, when poured into the left hollow shaft portion 15a of the rotating shaft 15 as shown in FIG. 10, the refrigerant flows through four types of through-holes, that is, the d-axis through-holes 26, voids 23a, voids 23b and the q-axis through-holes 27 in parallel in the rotor core 11. Accordingly, the permanent magnets 12 and the rotor core 11 are cooled in the fourth embodiment more effectively than in the third embodiment. Consequently, the temperature increase in the permanent magnets 12 is suppressed and demagnetization of the permanent magnets 12 is prevented, whereupon reduction in the developed torque can be avoided.

Figure 12:
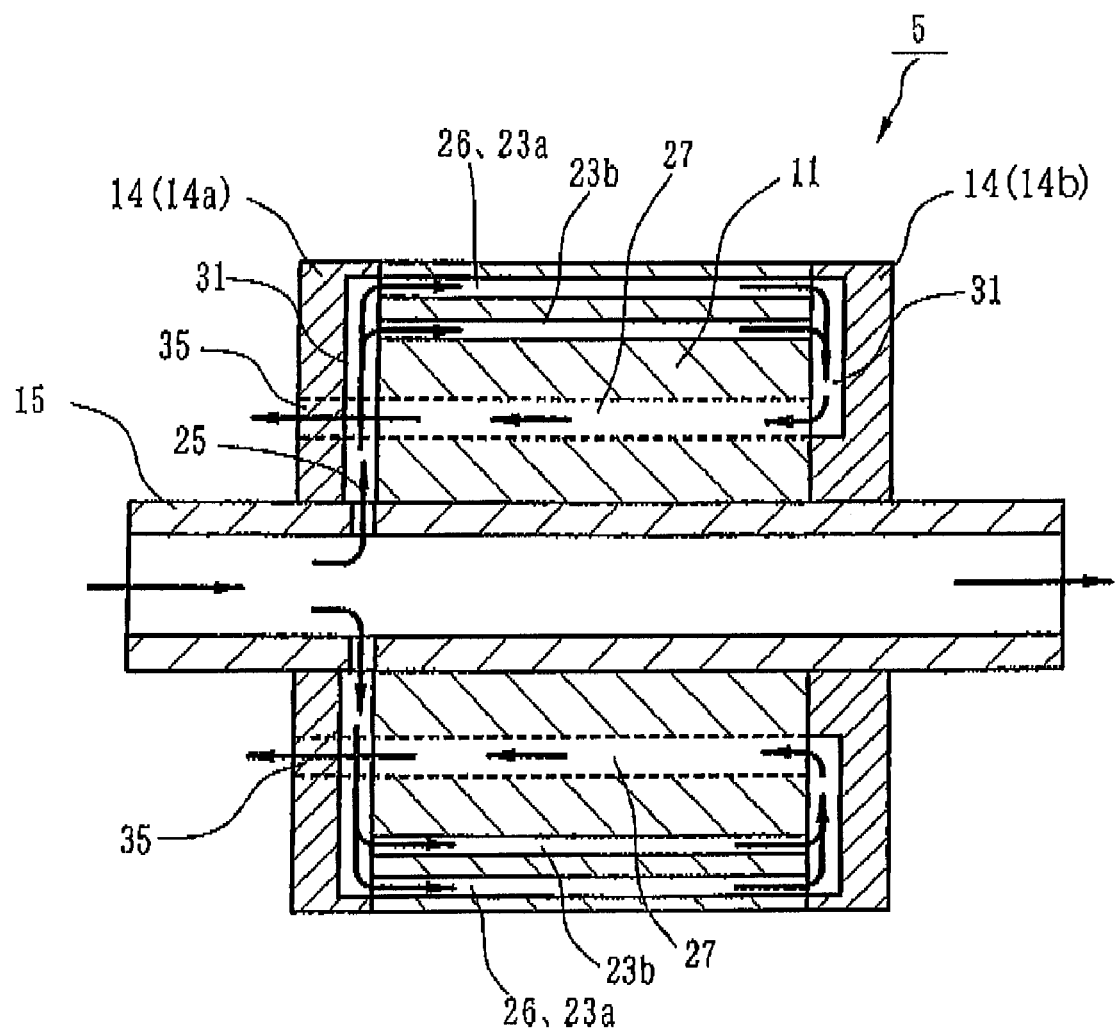
FIG. 12 is a view similar to FIG. 5, showing the rotor 5 of a fifth embodiment.
Figure 13A:
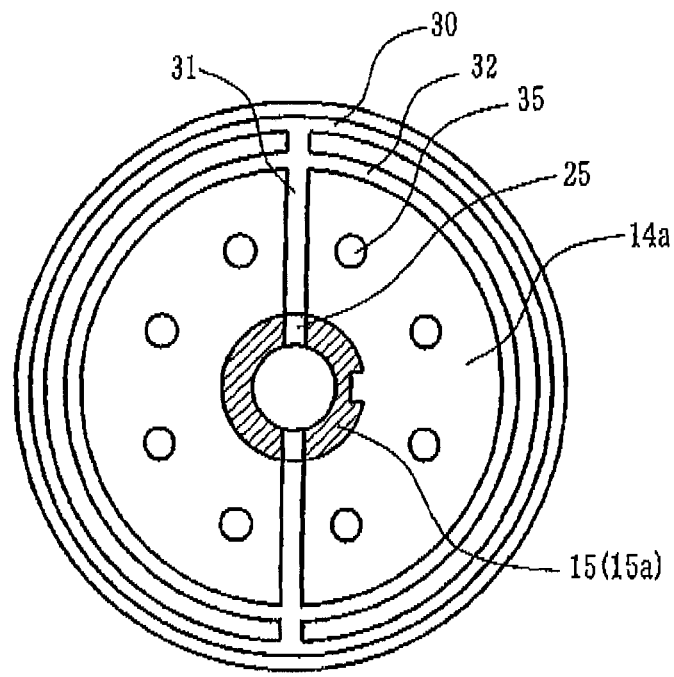
FIG. 13A is a front view of the left presser plate 14a in the rotor 5 of the fifth embodiment as viewed at the rotor core 11 side.
Figure 13B:
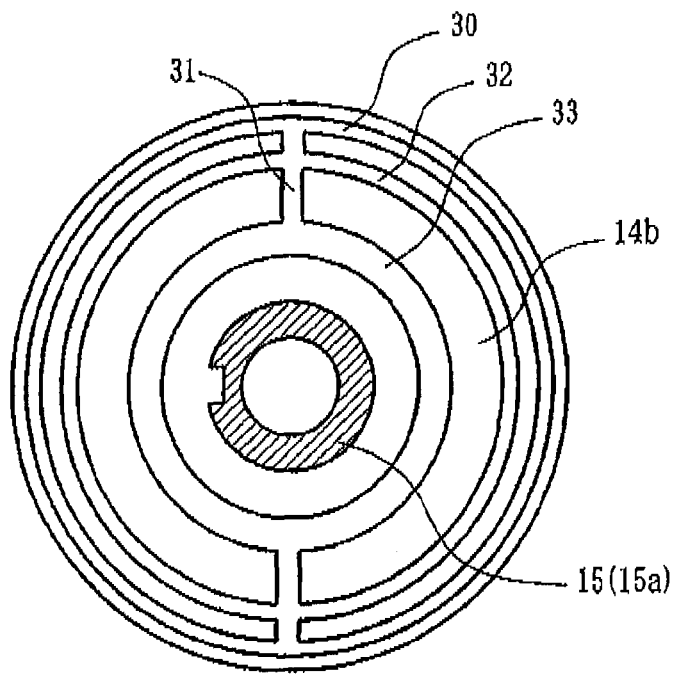
FIG. 13B is a front view of the right presser plate 14b in the rotor 5 of the fifth embodiment as viewed at the rotor core 11 side.

The rotor and the rotating machine employing the rotor of a fifth embodiment of the invention will now be described with reference to FIGS. 12, 13A and 13B. In these figures, identical or similar parts are labeled by the same reference symbols as those in FIGS. 10, 1A and 11B of the fourth embodiment. FIG. 12 is a longitudinal section of the rotor 5 of the embodiment. FIG. 13A is a view of the left presser plate 14a pressing the rotor core 11 from the left side as viewed from the rotor core 11 side. FIG. 13B is a view of the right presser plate 14b pressing the rotor core 11 from the right side as viewed from the rotor core 11 side. The figures also show the section of the rotating shaft 15 running through the shown portions of the rotor core 11.

The left presser plate 14a of the embodiment as shown in FIG. 13A is formed by adding presser plate refrigerant outlets 35 to the left presser plate 14a of the third embodiment as shown in FIGS. 9A and 9B so that the presser plate refrigerant outlets 35 are located at positions opposed to the q-axis through-holes 27 (see FIG. 3) at the rotor core 11 side. The annular grooves include the first annular grooves 30 connecting the d-axis through-holes 26 and the voids 23a as in the third embodiment and the second annular grooves 32 connecting the voids 23b.

The right presser plate 14b of the embodiment as shown in FIG. 13B has a changed construction of the radial grooves 31 in the right presser plate 14b plane-symmetric with the left presser plate 14a of the fourth embodiment as shown in FIGS. 11A and 11B. In this case, the radial grooves 31 connect the first, second and third annular grooves 30, 32 and 33 to one another.

Figure 29:
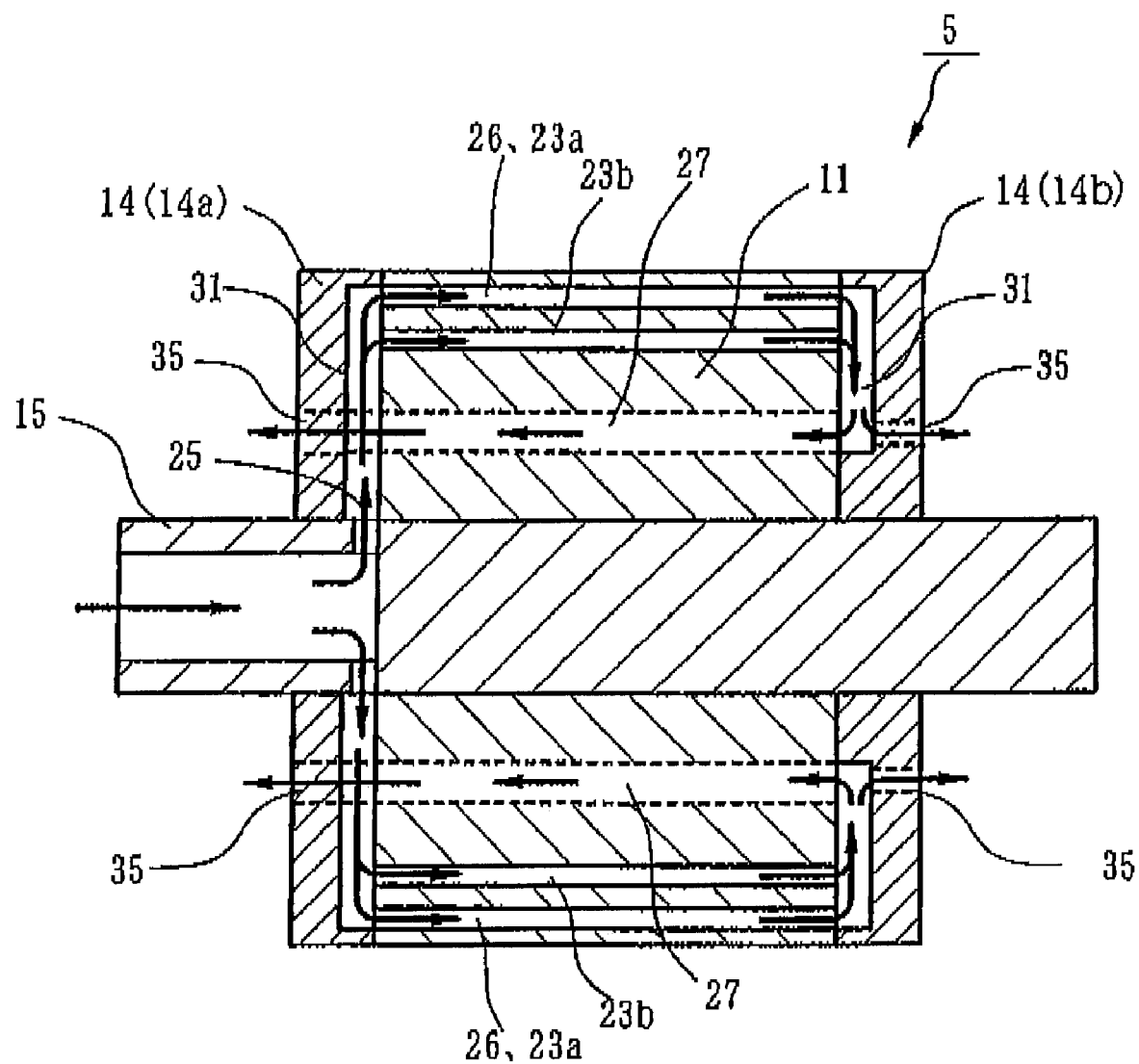
FIG. 29 is a view showing a modified form of the rotating shaft 15 of the rotor as shown in FIG. 14.

Although the rotating shaft 15 includes a whole part thereof formed into a hollow shaft as shown in FIG. 12, only a part thereof inserted through the rotor core 11 may be formed into a hollow shaft as in the rotating shaft 15 of the fourth embodiment as shown in FIG. 10. Furthermore, the rotating shaft 15 as shown in FIG. 29 may include a part from the end at the refrigerant inlet side to a portion communicating with the hollow shaft wall hole 25. The part may be formed into a hollow shaft and the other part may be formed into a solid shaft.

When poured into the left hollow shaft portion 15a of the rotating shaft 15 with the above-described construction, the refrigerant flows as shown by arrows in FIG. 12. The refrigerant flows through the through-holes, that is, the d-axis through-holes 26, voids 23a, voids 23b and q-axis through-holes 27 in the rotor core 11, whereby the permanent magnets 12 and the rotor core 11 are cooled. Accordingly, the temperature increase in the permanent magnets 12 is suppressed and demagnetization of the permanent magnets 12 is prevented, whereupon reduction in the developed torque can be avoided.

The rotor of a sixth embodiment of the invention will now be described with reference to FIGS. 14, 15A and 15B. In these figures, identical or similar parts are labeled by the same reference symbols as those in FIGS. 12, 13A and 13B of the firth embodiment. FIG. 12 is a longitudinal section of the rotor 5 of the embodiment. FIG. 15A is a view of the left presser plate 14a pressing the rotor core 11 from the left side as viewed from the rotor core 11 side. FIG. 15B is a view of the right presser plate 14b pressing the rotor core 11 from the right side as viewed from the rotor core 11 side. The figures also show the section of the rotating shaft 15 running through the shown portions of the rotor core 11.

Figure 14:
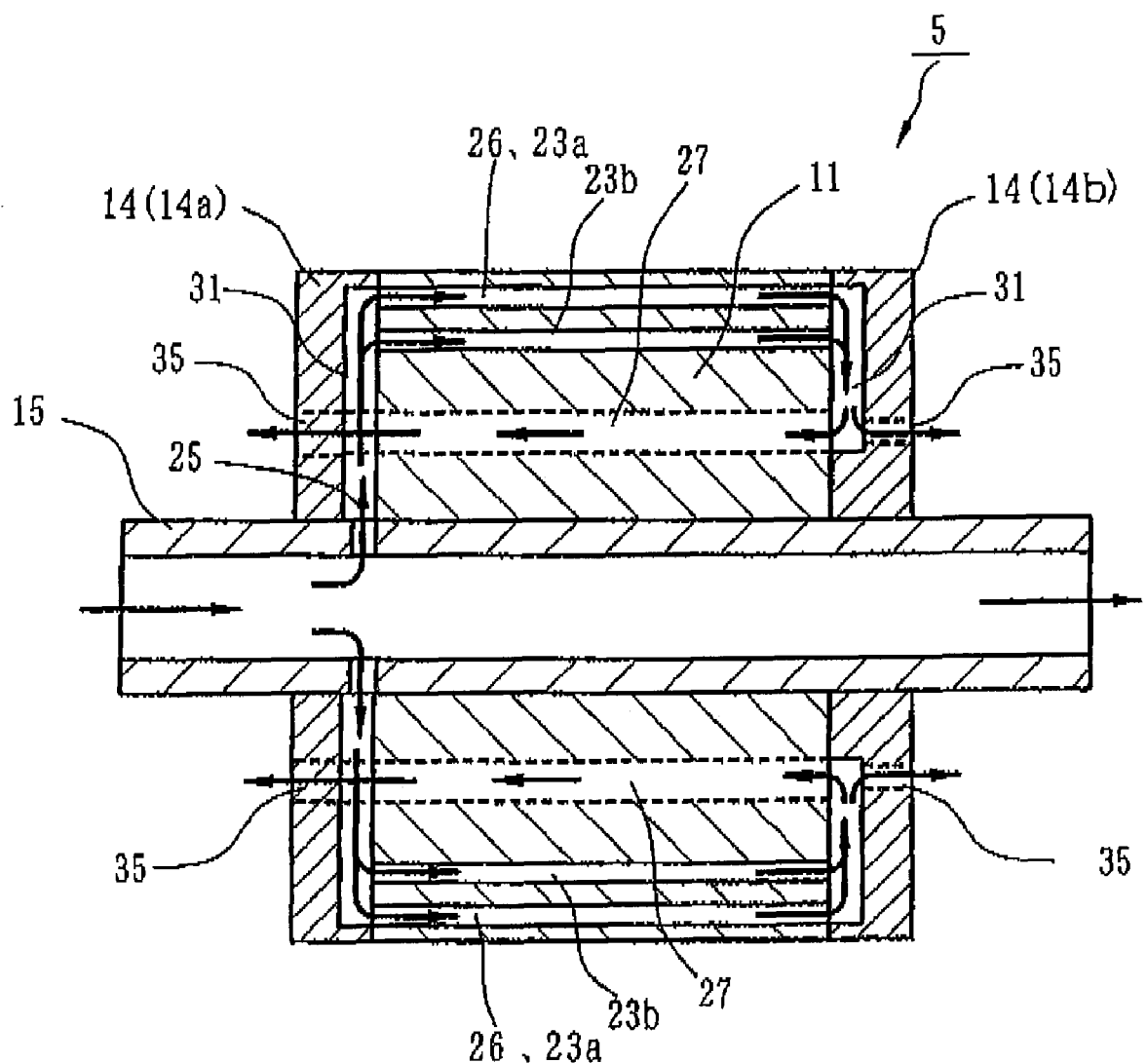
FIG. 14 is view similar to FIG. 5, showing the rotor 5 of a sixth embodiment.
Figure 15A:
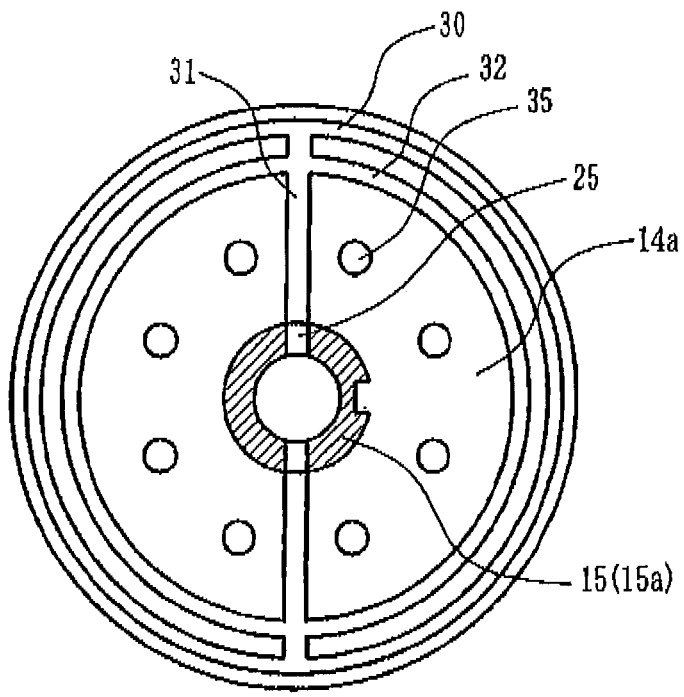
FIG. 15A is a front view of the left presser plate 14a in the rotor 5 of the sixth embodiment as viewed at the rotor core 11 side.
Figure 15B:
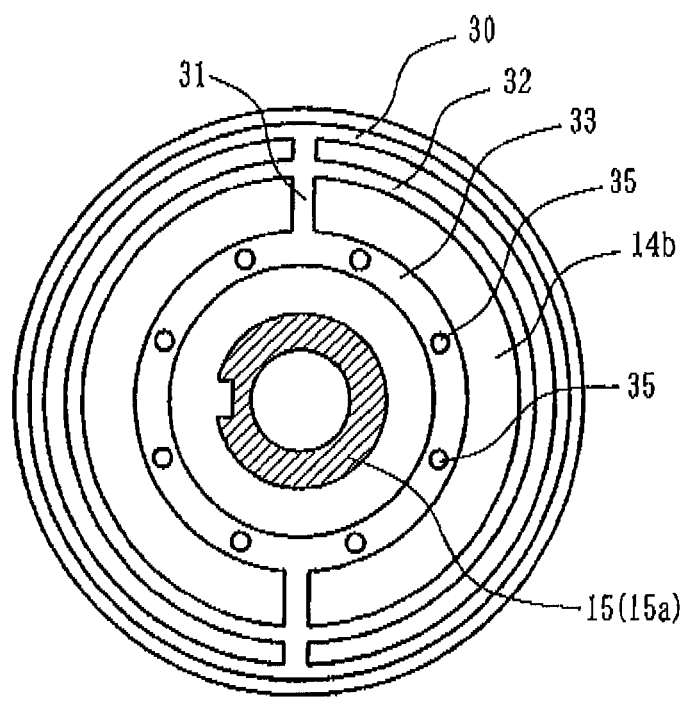
FIG. 15B is a front view of the right presser plate 14b in the rotor 5 of the sixth embodiment as viewed at the rotor core 11 side.

Although the rotating shaft 15 includes a whole part thereof formed into a hollow shaft as shown in FIG. 14, only a part thereof inserted through the rotor core 11 may be formed into a hollow shaft as in the rotating shaft 15 of the fourth embodiment as shown in FIG. 10. Furthermore, the rotating shaft 15 as shown in FIG. 29 may include a part from the end at the refrigerant inlet side to a portion communicating with the hollow shaft wall hole 25. The part may be formed into a hollow shaft and the other part may be formed into a solid shaft.

When poured into the rotating shaft 15 with the above-described constructions the refrigerant flows as shown by arrows in FIG. 14. The refrigerant flows through the through-holes, that is, the d-axis through-holes 26, voids 23a and voids 23b in parallel from the left toward the right in the rotor core 11. The refrigerant then flows into the radial groove 31 of the right presser plate 14b. In the radial groove, part of the refrigerant flows outside the rotor core 11 through the presser plate refrigerant outlet 35 provided at the position opposed to the q-axis through-hole 27. The remaining refrigerant turns around thereby to flow through the q-axis through-hole 27 of the rotor core 11 from the right toward the left, flowing outside the rotor core 11 through the presser plate refrigerant outlet hole 35 located opposite the q-axis through-hole 27 provided in the left presser plate 14a. More specifically, the refrigerant flows outside the rotor core 11 through the presser plate refrigerant outlet holes 35 located opposite the q-axis through-holes 27 of the left and right presser plates 14a and 14b respectively in the embodiment.

In the sixth embodiment, too, the refrigerant flows through the through-holes, that is, the d-axis through-holes 26, voids 23a, voids 23b and q-axis through-holes 27 in the rotor core 11, whereby the permanent magnets 12 and the rotor core 11 are cooled. Accordingly, the temperature increase in the permanent magnets 12 is suppressed and demagnetization of the permanent magnets 12 is prevented, whereupon reduction in the developed torque can be avoided. Furthermore, since the refrigerant is caused to flow out of the presser plate refrigerant outlet holes 35, the stator 45 can also be cooled.

The rotor of a seventh embodiment of the invention will now be described with reference to FIGS. 16, 17A and 17B. In these figures, identical or similar parts are labeled by the same reference symbols as those in FIGS. 10, 11A and 11B of the fourth embodiment. FIG. 17A is a view of the left presser plate 14a pressing the rotor core 11 from the left side as viewed from the rotor core 11 side. FIG. 17B is a view of the right presser plate 14b pressing the rotor core 11 from the right side as viewed from the rotor core 11 side. The figures also show the section of the rotating shaft 15 running through the shown portions of the rotor core 11.

The rotor 5 of the embodiment differs from the rotor 5 of the fourth embodiment in the additional provision of a plurality of presser plate refrigerant outlet holes 35 in the third annular groove 33 formed in the faces of the left and right presser plates 14a and 14b in contact with the rotor core 11 and in that the radial groove 33 of the right presser plate 14b connects only the first, second and third annular grooves 30, 32 and 33 to one another. The added presser plate refrigerant outlet holes 35 are arranged equiangularly and may or may not be provided so as to be opposite the q-axis through-holes 27 (see FIG. 3) of the rotor core 11. The presser plate refrigerant outlet holes 35 provided in the left presser plate 14a have smaller diameters than the presser plate refrigerant outlet holes 35 of the right presser plate 14b.

Figure 16:
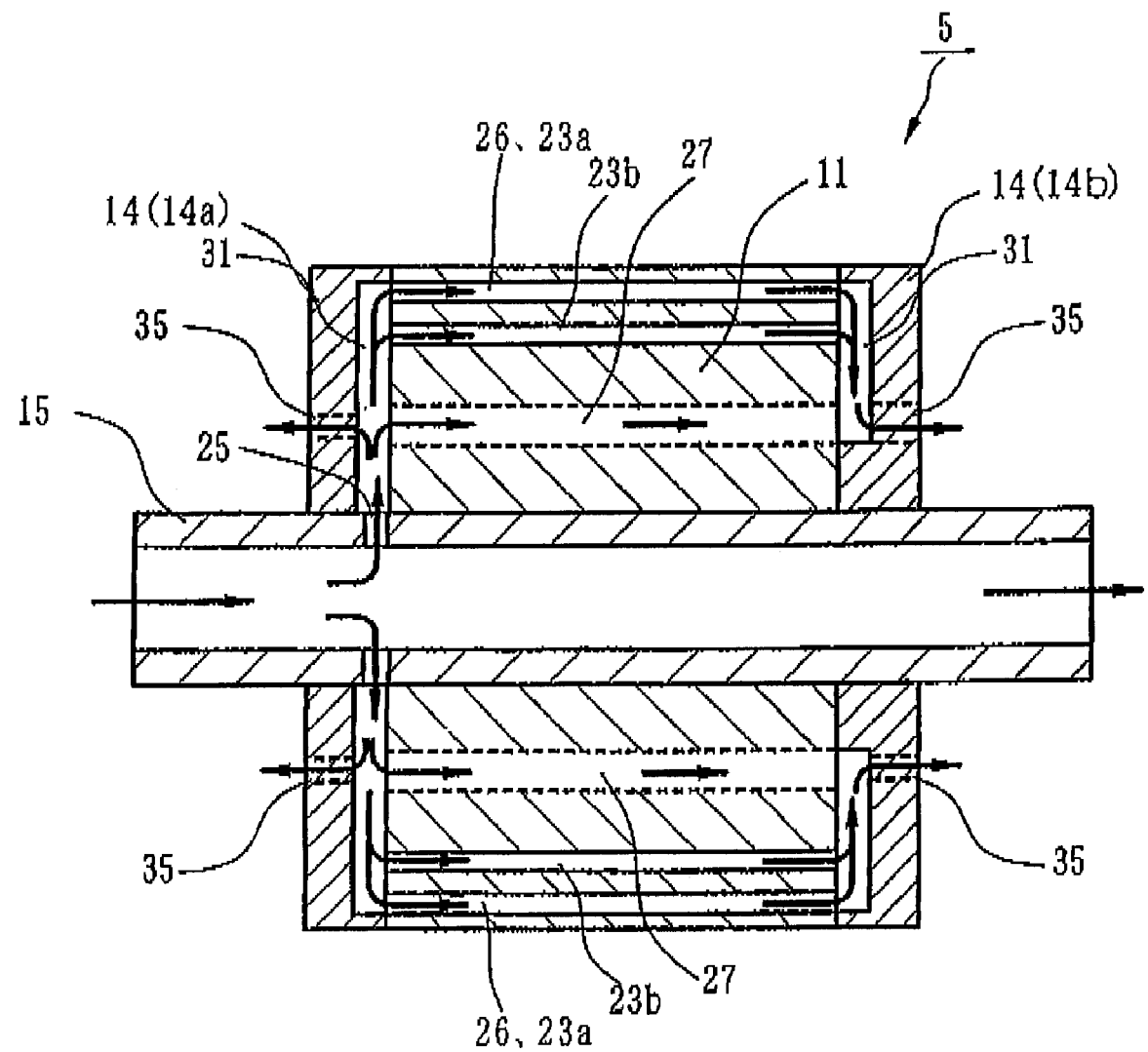
FIG. 16 is a view similar to FIG. 5, showing the rotor 5 of a seventh embodiment.
Figure 17A:
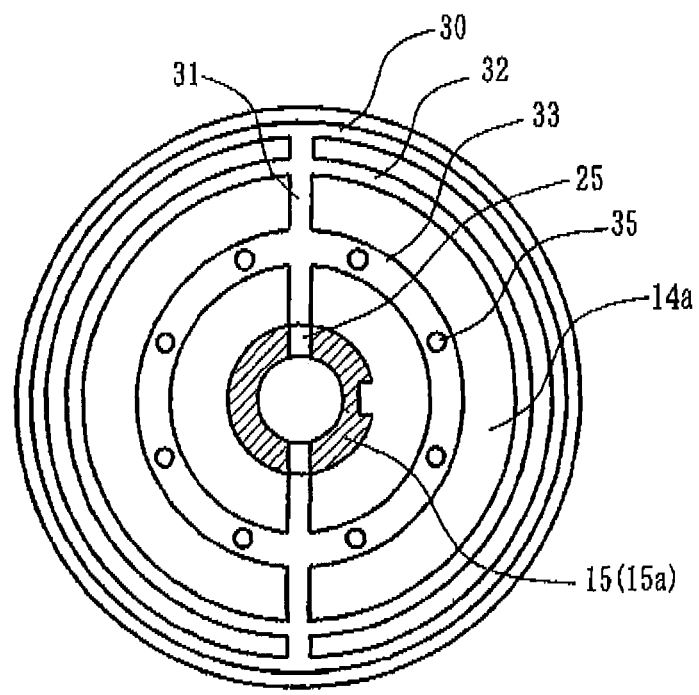
FIG. 17A is a front view of the right presser plate 14a in the rotor 5 of the seventh embodiment as viewed at the rotor core 11 side.
Figure 17B:
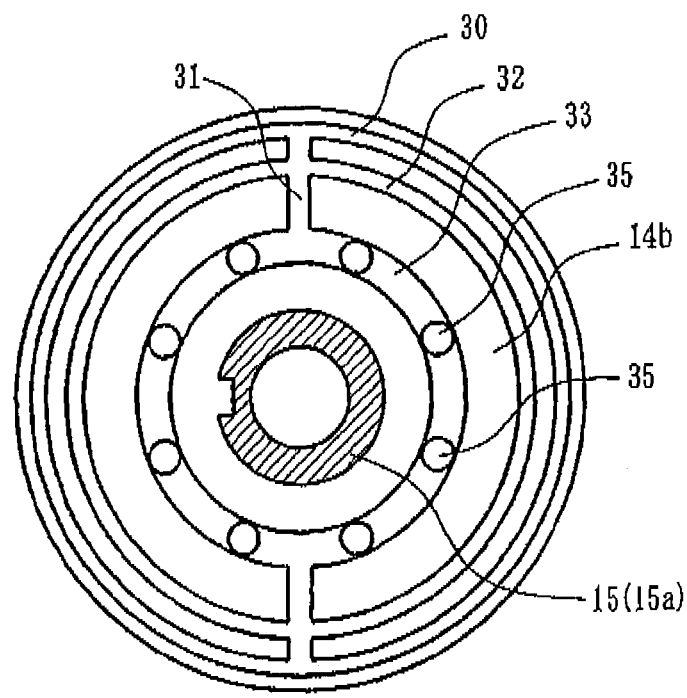
FIG. 17B is a front view of the right presser plate 14b in the rotor 5 of the seventh embodiment as viewed at the rotor core 11 side.

Although the rotating shaft 15 includes a whole part thereof formed into a hollow shaft as shown in FIG. 16, only a part thereof inserted through the rotor core 11 may be formed into a hollow shaft as in the rotating shaft 15 of the fourth embodiment as shown in FIG. 10. Furthermore, the rotating shaft 15 as shown in FIG. 29 may include a part from the end at the refrigerant inlet side to a portion communicating with the hollow shaft wall hole 25. The part may be formed into a hollow shaft and the other part may be formed into a solid shaft.

When poured into the rotating shaft 15 with the above-described construction, the refrigerant flows as shown by arrows in FIG. 16. Part of the refrigerant having flowed in the radial groove 31 of the left presser plate 14a flows out of the rotor core 11 through the third annular groove 33 and the presser plate refrigerant outlet holes 35 without passing through the through holes provided in the rotor core 11. Furthermore, the refrigerant having flowed into the first, second and third annular grooves 30, 32 and 33 of the right presser plate 14b flows out of the rotor core 11 through the presser plate refrigerant outlet holes 35 provided in the third annular groove 33.

The refrigerant also flows through the through-holes in the embodiment, that is, the d-axis through-holes 26, voids 23a, voids 23b and q-axis through-holes 27 in the rotor core 11, whereby the permanent magnets 12 and the rotor core 11 are cooled. Accordingly, the temperature increase in the permanent magnets 12 is suppressed and demagnetization of the permanent magnets 12 is prevented, whereupon reduction in the developed torque can be avoided.

The rotor of an eighth embodiment of the invention will now be described with reference to FIGS. 18, 19A and 19B. In these figures, identical or similar parts are labeled by the same reference symbols as those in FIGS. 4A, 4B and 5 of the first embodiment. FIG. 19A is a view of the left presser plate 14a pressing the rotor core 11 from the left side as viewed from the rotor core 11 side. FIG. 19B is a view of the right presser plate 14b pressing the rotor core 11 from the right side as viewed from the rotor core 11 side. The figures also show the section of the rotating shaft 15 running through the shown portions of the rotor core 11.

The rotor 5 of the embodiment differs from the rotor 5 of the first embodiment in the additional provision of fourth annular grooves 34 in the left and right presser plates 14a and 14b and in that a plurality of presser plate outlet holes 35 which are formed in the bottom of the fourth annular grooves 34 and communicate with the axial outside, as shown in FIGS. 19A and 19B. The fourth annular grooves 34 are formed inside relative to the first annular grooves 30. The added presser plate refrigerant outlet holes 35 are arranged equiangularly. The presser plate refrigerant outlet holes 35 provided in the left presser plate 14a have smaller diameters than the presser plate refrigerant outlet holes 35 of the right presser plate 14b. The radial groove 31 of the left presser plate 14a is formed so as to connect the first and fourth annular grooves 30 and 34 to the hollow shaft wall holes 25, and the radial groove 31 of the right presser plate 14b is formed so as to connect the first and fourth annular grooves 30 and 34 to each other.

Although the rotating shaft 15 includes a whole part thereof formed into a hollow shaft as shown in FIG. 16, only a part thereof inserted through the rotor core 11 may be formed into a hollow shaft as in the rotating shaft 15 of the fourth embodiment as shown in FIG. 5. Furthermore, the rotating shaft 15 as shown in FIG. 29 may include a part from the end at the refrigerant inlet side to a portion communicating with the hollow shaft wall hole 25. The part may be formed into a hollow shaft and the other part may be formed into a solid shaft.

Figure 18:
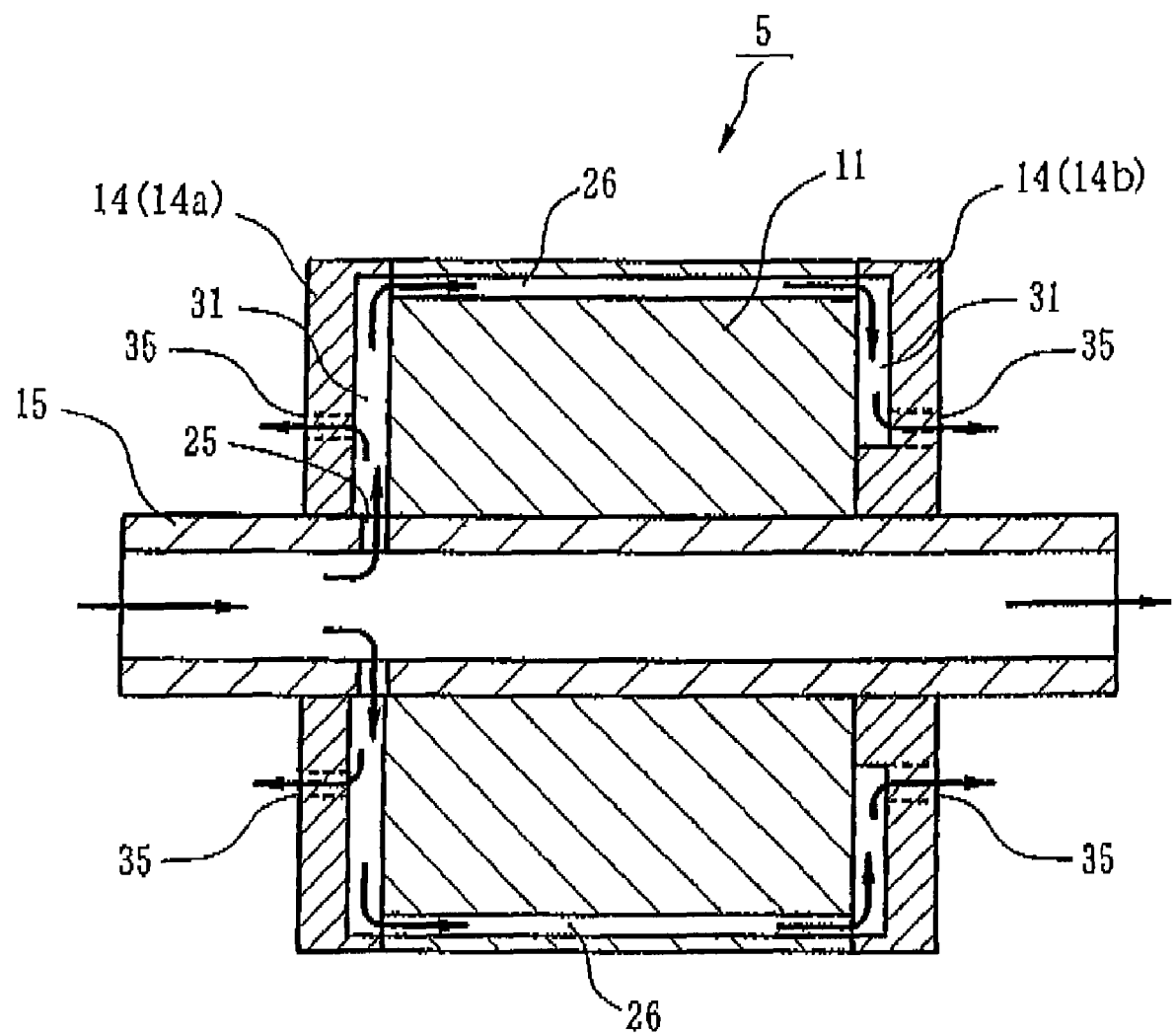
FIG. 18 is a view similar to FIG. 5, showing the rotor 5 of an eighth embodiment.
Figure 19A:
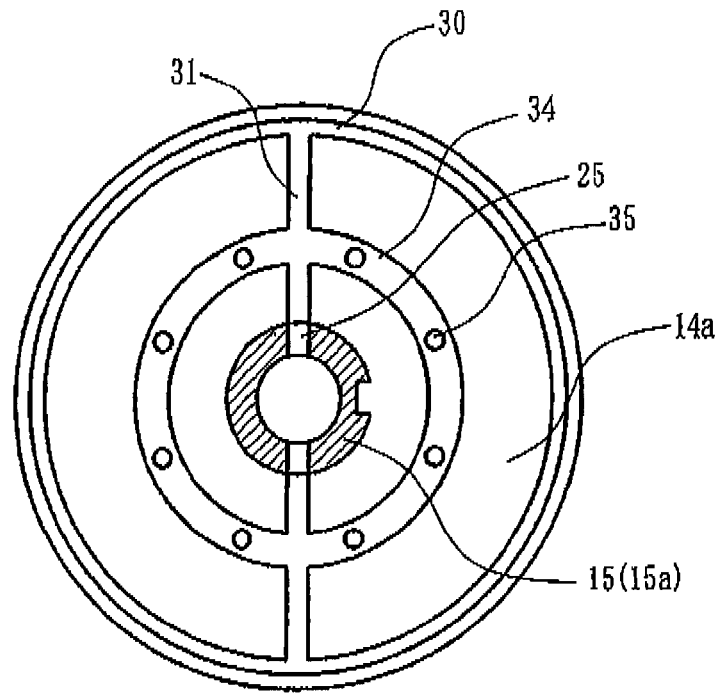
FIG. 19A is a front view of the left presser plate 14a in the rotor 5 of the eighth embodiment as viewed at the rotor core 11 side.
Figure 19B:
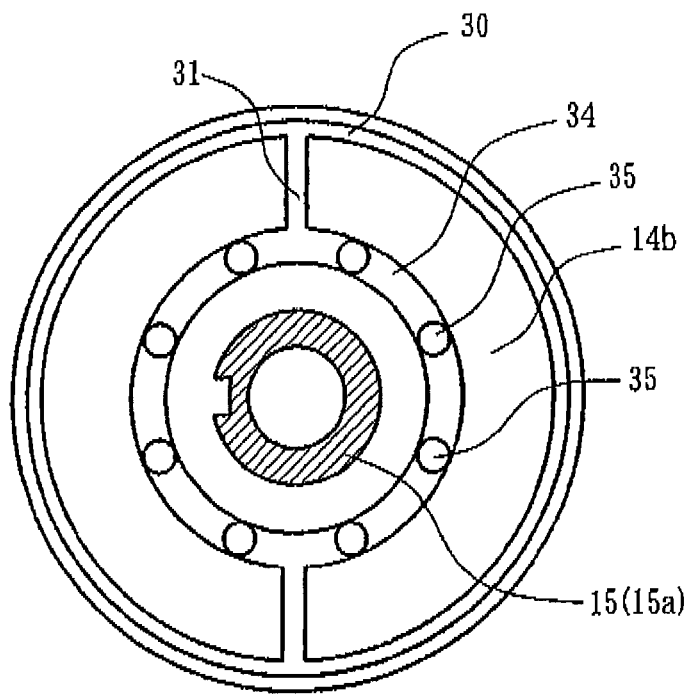
FIG. 19B is a front view of the right presser plate 14b in the rotor 5 of the eighth embodiment as viewed at the rotor core 11 side.

When poured into the rotating shaft 15 with the above-described construction, the refrigerant flows as shown by arrows in FIG. 18. Part of the refrigerant having flowed in the radial groove 31 of the left presser plate 14a flows out of the rotor core 11 through the fourth annular groove 34 and the presser plate refrigerant outlet holes 35 without passing through the through holes provided in the rotor core 11. Furthermore, the refrigerant flows into the first annular groove 30 of the right presser plate 14b though the d-axis through-hole 26 axially running through the rotor core 11, further flowing out of the rotor core 11 through the presser plate refrigerant outlet holes 35 provided in the fourth annular groove 34.

The refrigerant also flows through the d-axis through-holes 26 in the embodiment, whereby the permanent magnets 12 and the rotor core 11 are cooled. Accordingly, the temperature increase in the permanent magnets 12 is suppressed and demagnetization of the permanent magnets 12 is prevented, whereupon reduction in the developed torque can be avoided.

The rotor of a ninth embodiment of the invention will now be described with reference to FIGS. 20, 21A and 21B. In these figures, identical or similar parts are labeled by the same reference symbols as those in FIGS. 6, 7A and 7B of the second embodiment. FIG. 21A is a view of the left presser plate 14a pressing the rotor core 11 from the left side as viewed from the rotor core 11 side. FIG. 21B is a view of the right presser plate 14b pressing the rotor core 11 from the right side as viewed from the rotor core 11 side. The figures also show the section of the rotating shaft 15 running through the shown portions of the rotor core 11.

The rotor 5 of the embodiment differs from the rotor 5 of the second embodiment in the additional provision of fourth annular grooves 34 in the left and right presser plates 14a and 14b and in that a plurality of presser plate outlet holes 35 which are formed in the bottom of the fourth annular grooves 34 and communicate with the axial outside, as shown in FIGS. 19A and 19B. The fourth annular grooves 34 are formed inside relative to the second annular grooves 32. The added presser plate refrigerant outlet holes 35 are arranged equiangularly. The presser plate refrigerant outlet holes 35 provided in the left presser plate 14a have smaller diameters than the presser plate refrigerant outlet holes 35 of the right presser plate 14b. The radial groove 31 of the left presser plate 14a is formed so as to connect the second and fourth annular grooves 32 and 34 to the hollow shaft wall holes 25, and the radial groove 31 of the right presser plate 14b is formed so as to connect the second and fourth annular grooves 32 and 34 to each other.

Figure 20:
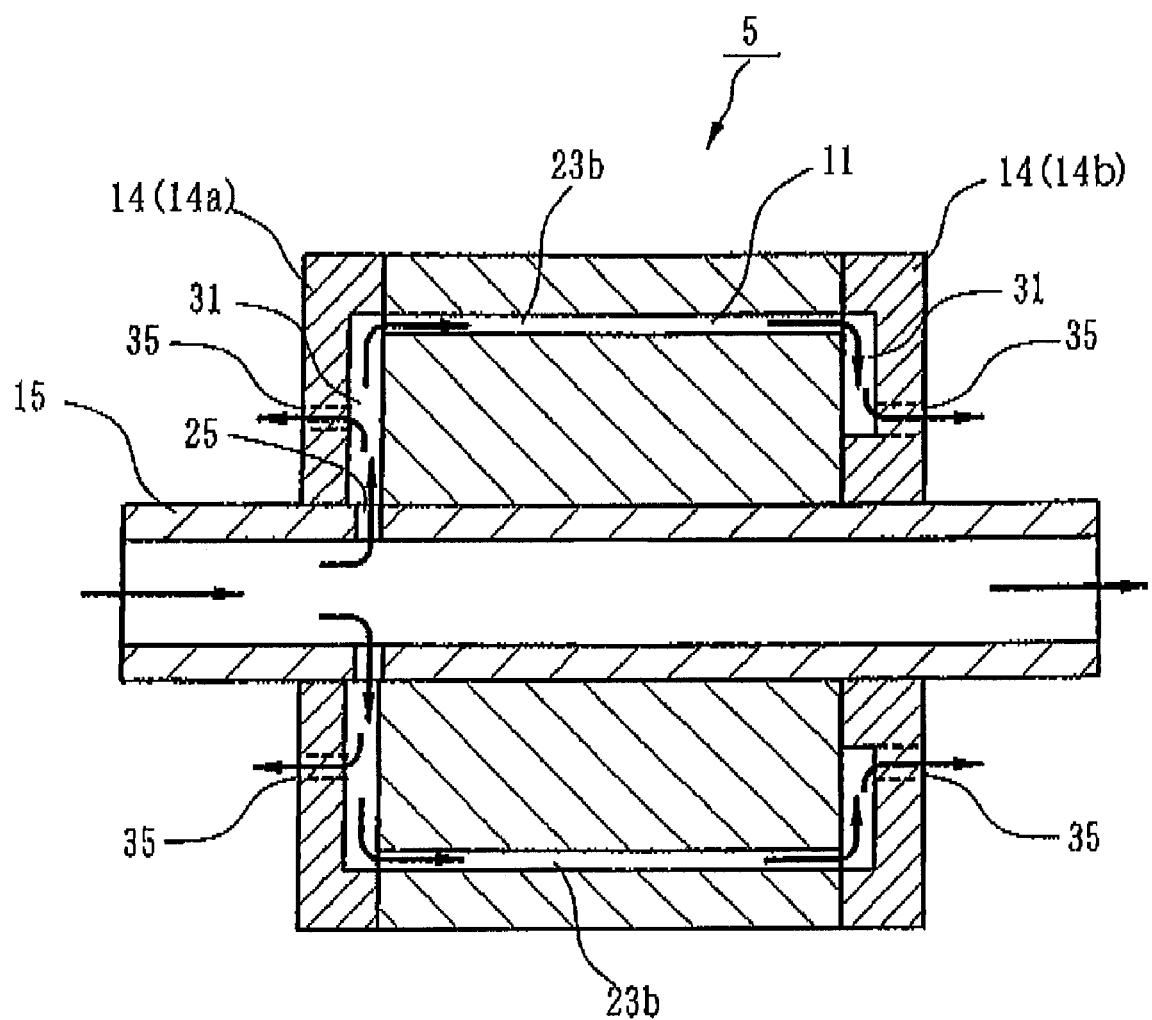
FIG. 20 is a view similar to FIG. 5, showing the rotor 5 of a ninth embodiment.
Figure 21A:
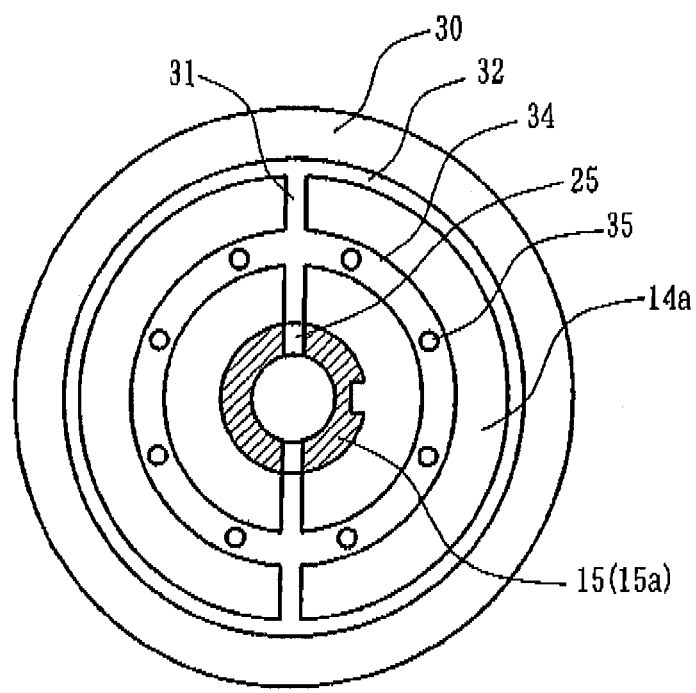
FIG. 21A is a front view of the left presser plate 14a in the rotor 5 of the ninth embodiment as viewed at the rotor core 11 side.
Figure 21B:
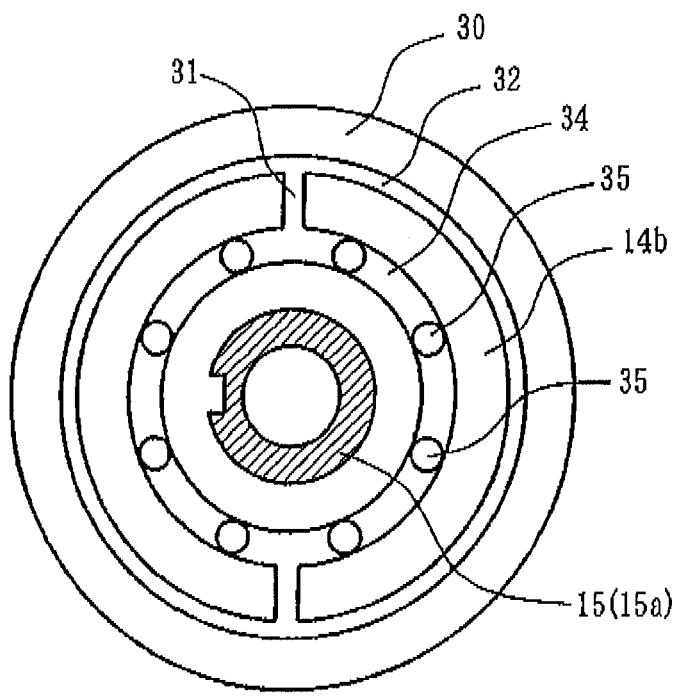
FIG. 21B is a front view of the right presser plate 14b in the rotor 5 of the ninth embodiment as viewed at the rotor core 11 side.

Although the rotating shaft 15 includes a whole part thereof formed into a hollow shaft as shown in FIG. 20, only a part thereof inserted through the rotor core 11 may be formed into a hollow shaft as in the rotating shaft 15 of the second embodiment as shown in FIG. 6. Furthermore, the rotating shaft 15 as shown in FIG. 29 may include a part from the end at the refrigerant inlet side to a portion communicating with the hollow shaft wall hole 25. The part may be formed into a hollow shaft and the other part may be formed into a solid shaft.

When poured into the rotating shaft 15 with the above-described construction, the refrigerant flows as shown by arrows in FIG. 20. Part of the refrigerant having flowed in the radial groove 31 of the left presser plate 14a flows out of the rotor core 11 through the fourth annular groove 34 and the presser plate refrigerant outlet holes 35. Furthermore, the refrigerant flows into the second annular groove 32 of the right presser plate 14b though the void 23b axially running through the rotor core 11r further flowing out of the rotor core 11 through the presser plate refrigerant outlet holes 35 provided in the fourth annular groove 34.

The refrigerant also flows through the void 23b of the rotor core 11 in the embodiment, whereby the permanent magnets 12 and the rotor core 11 are cooled. Accordingly, the temperature increase in the permanent magnets 12 is suppressed and demagnetization of the permanent magnets 12 is prevented, whereupon reduction in the developed torque can be avoided.

The rotor of a tenth embodiment of the invention will now be described with reference to FIGS. 22, 23A and 23B. In these figures, identical or similar parts are labeled by the same reference symbols as those in FIGS. 8, 9A and 9B of the third embodiment. FIG. 23A is a view of the left presser plate 14a pressing the rotor core 11 from the left aide as viewed from the rotor core 11 side. FIG. 23B is a view of the right presser plate 14b pressing the rotor core 11 from the right side as viewed from the rotor core 11 side. The figures also show the section of the rotating shaft 15 running through the shown portions of the rotor core 11.

The rotor 5 of the embodiment differs from the rotor 5 of the third embodiment in the additional provision of fourth annular grooves 34 in the left and right presser plates 14a and 14b and in that a plurality of presser plate outlet holes 35 which are formed in the bottom of the fourth annular grooves 34 and communicate with the axial outside, as shown in FIGS. 23A and 23B. The fourth annular grooves 34 are formed inside relative to the second annular grooves 32. The added presser plate refrigerant outlet holes 35 are arranged equiangularly. The presser plate refrigerant outlet holes 35 provided in the left presser plate 14a have smaller diameters than the presser plate refrigerant outlet holes 35 of the right presser plate 14b. The radial groove 31 of the left presser plate 14a is formed so as to connect the first, second and fourth annular grooves 30, 32 and 34 to the hollow shaft wall holes 25, and the radial groove 31 of the right presser plate 14b is formed so as to connect the first, second and fourth annular grooves 30, 32 and 34 to each other.

Figure 22:
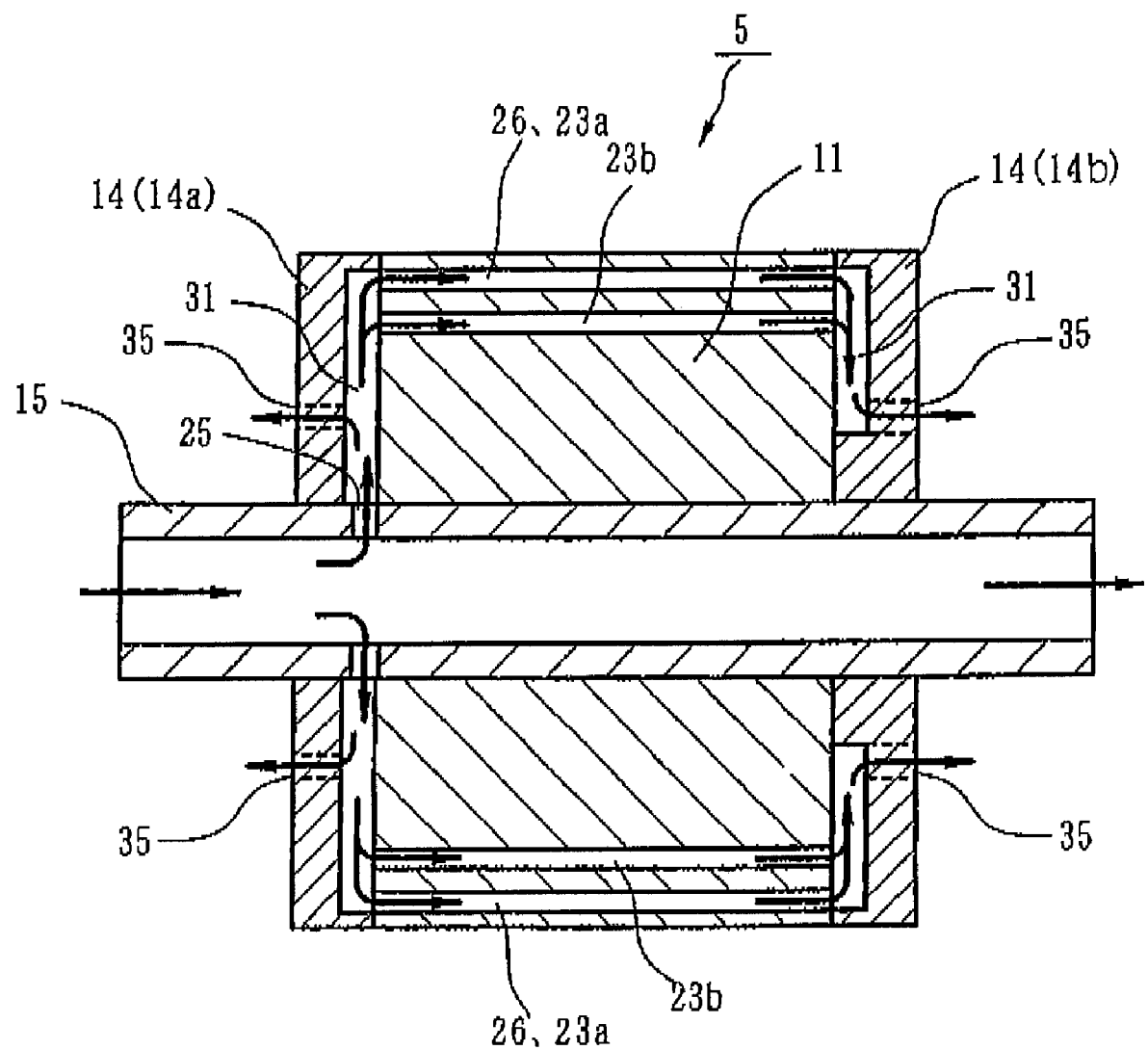
FIG. 22 is a view similar to FIG. 5, showing the rotor 5 of a tenth embodiment.
Figure 23A:
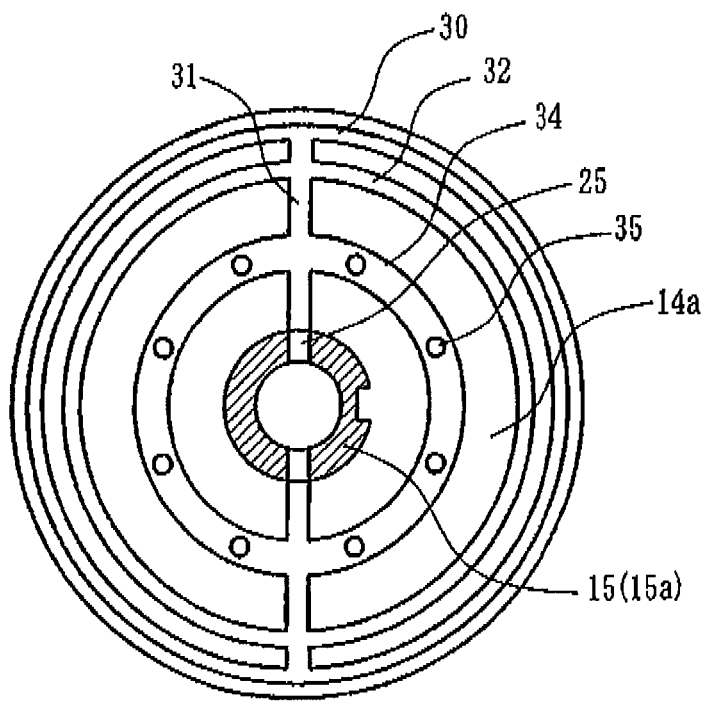
FIG. 23A is a front view of the left presser plate 14a in the rotor 5 of the tenth embodiment as viewed at the rotor core 11 side.
Figure 23B:
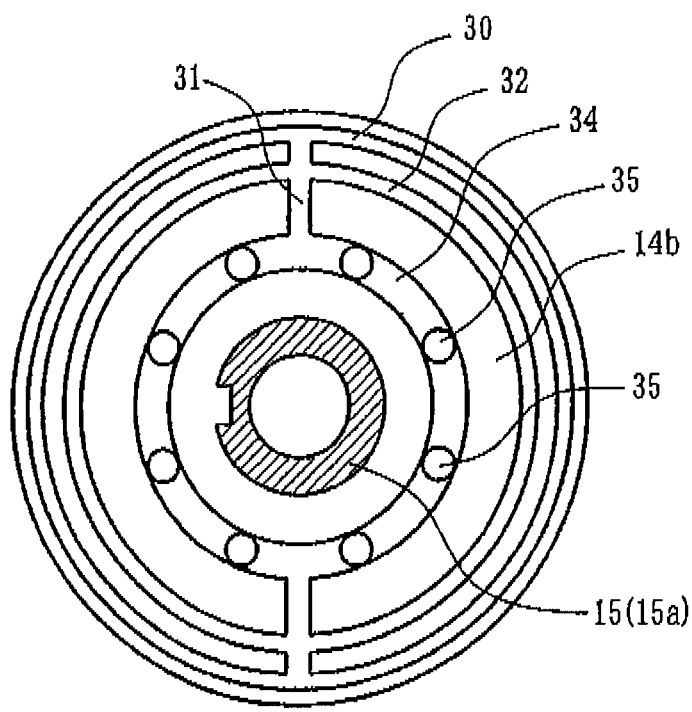
FIG. 23B is a front view of the right presser plate 14b in the rotor 5 of the tenth embodiment as viewed at the rotor core 11 side.

Although the rotating shaft 15 includes a whole part thereof formed into a hollow shaft as shown in FIG. 22, only a part thereof inserted through the rotor core 11 may be formed into a hollow shaft as in the rotating shaft 15 of the third embodiment as shown in FIG. 8. Furthermore, the rotating shaft 15 as shown in FIG. 29 may include a part from the end at the refrigerant inlet side to a portion communicating with the hollow shaft wall hole 25. The part may be formed into a hollow shaft and the other part may be formed into a solid shaft.

When poured into the rotating shaft 15 with the above-described construction, the refrigerant flows as shown by arrows in FIG. 22. Part of the refrigerant having flowed in the radial groove 31 of the left presser plate 14a flows out of the rotor core 11 through the fourth annular groove 34 and the presser plate refrigerant outlet holes 35. Furthermore, the refrigerant flows into the first and second annular grooves 30 and 32 of the right presser plate 14b through the d-axis through-holes 26 axially running through the rotor core 11, the void 23a and the void 23b, further flowing out of the rotor core 11 through the presser plate refrigerant outlet holes 35 provided in the fourth annular groove 34.

The refrigerant also flows through the d-axis through-holes 26, void 23a and void 23b of the rotor core 11 in the embodiment, whereby the permanent magnets 12 and the rotor core 11 are cooled. Accordingly, the temperature increase in the permanent magnets 12 is suppressed and demagnetization of the permanent magnets 12 is prevented, whereupon reduction in the developed torque can be avoided.

Figure 24:
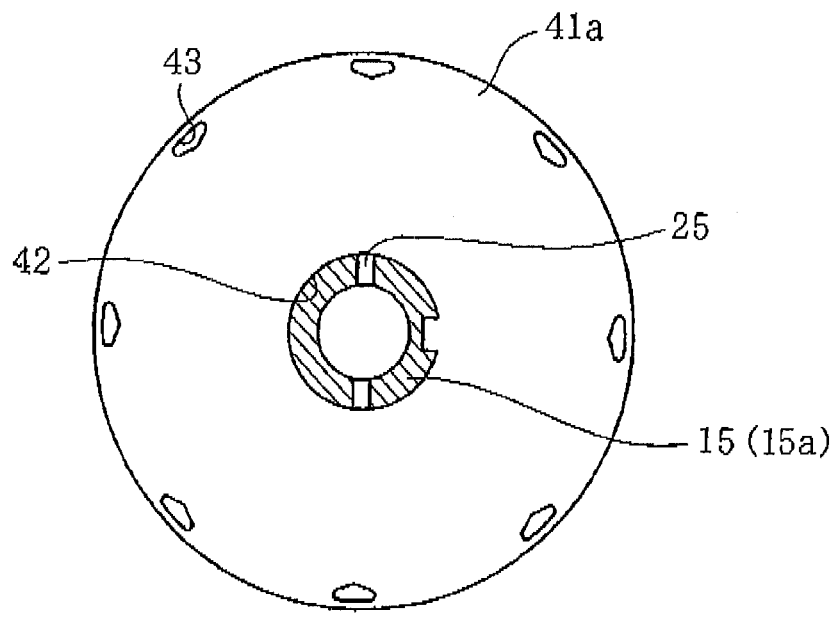
FIG. 24 is a front view of the left auxiliary plate 14a in the rotor 5 of an eleventh embodiment as viewed at the rotor core 11 side.

The rotor of an eleventh embodiment of the invention will now be described with reference to FIGS. 24 and 25. In these figures, identical or similar parts are labeled by the same reference symbols as those in FIG. 5 of the first embodiment. FIG. 24 is a view of an auxiliary plate 41a interposed between the rotor core 11 and the left presser plate 14a as viewed from the rotor core 11 side. The figure also shows the section of the rotating shaft 15 running through the shown portions of the rotor core 11.

The rotor 5 of the embodiment differs from the rotor 5 of the first embodiment in the additional provision of auxiliary plates 41a and 41b interposed between both axial end faces of the rotor core 11 and the left and right presser plates 14a and 14b respectively. The auxiliary plates 41a and 41b have the same outer diameter as the presser plates 14a and 14b and are centrally formed with fitting holes 42 through which the rotating shaft 15 is inserted thereby to be fixed. The auxiliary plates 41a and 41b have the same shape. The auxiliary plates 41a and 41b are each formed into a flat shape and each have eight passing holes 43 formed in an outer circumferential edge equiangularly. The passing holes 43 are formed so as to communicate with the d-axis through-holes 26 when disposed so as to abut against both end faces of the rotor core 11. As a result, the auxiliary plates 41a and 41b are interposed between the end faces of the rotor core 11 and the left and right presser plates 14a and 14b respectively, whereupon the voids 23a and 23b formed in the rotor core 11 and the q-axis through-holes 27 can be closed.

Figure 25:
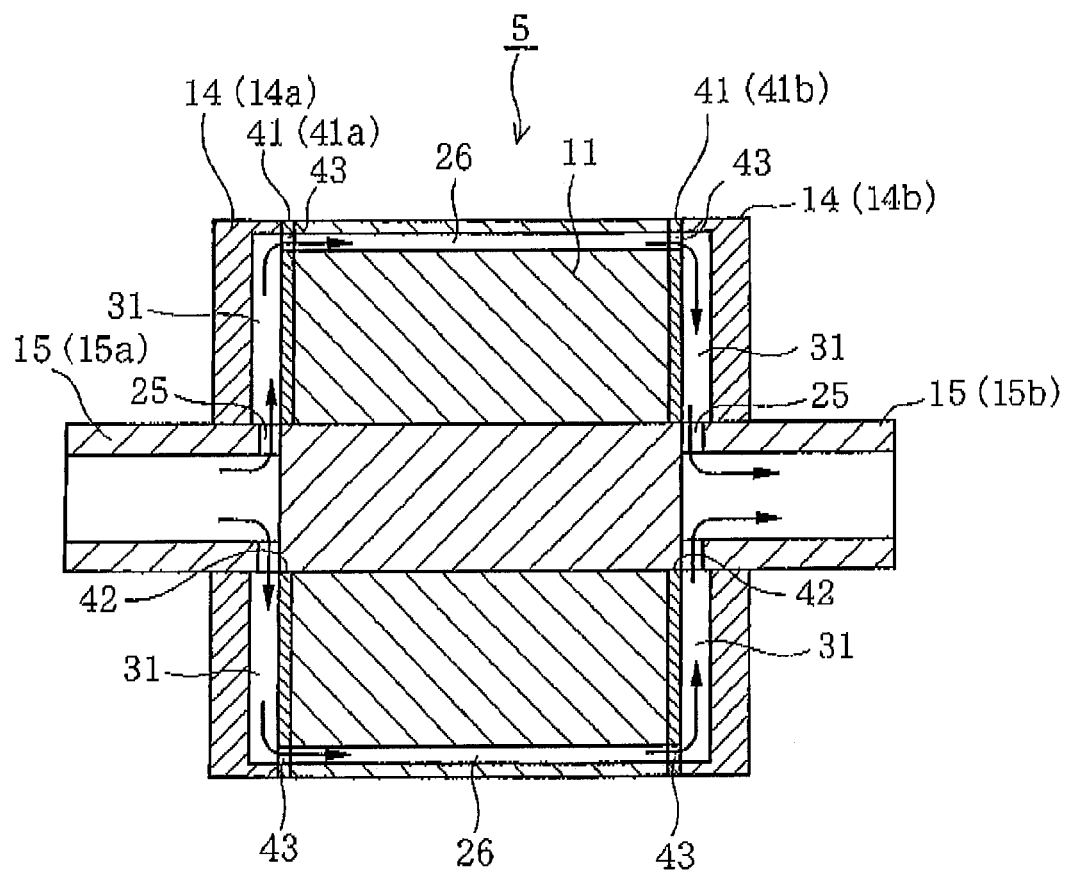
FIG. 25 is a view similar to FIG. 5, showing the rotor 5 of the eleventh embodiment.

Accordingly, when poured into the left hollow shaft portion 15a of the rotating shaft 15 as shown in FIG. 25, refrigerant flows out of the rotor core 11 through the hollow shaft wall hole 25 of the left hollow shaft portion 15a, the radial groove 31 of the left presser plate 14a, the first annular groove 30, the passing holes 43 of the left auxiliary plate 41a, the d-axis through-hole 26 of the rotor core 11, the passing holes 43 of the right auxiliary plate 41b, the first annular groove 30 of the right presser plate 14b, the radial groove 31, the hollow shaft wall hole 25 of the right hollow shaft portion 15a and the inside of the right hollow shaft portion 15b as shown by arrows in FIG. 25.

In the electric rotating machine 1, generally, the loss of the rotor 5 resulting from harmonic flux due to stator 4 side slots, that is, iron loss, is easier to occur on the surface of the rotor 5. In particular, the loss on the surface of the rotor core 11 tends to be increased with speed-up of rotation of the electric rotating machine 1. In order that the temperature of the magnets 12 of the rotor 5 may be decreased, it is effective to cool the surface and the vicinity thereof or a primary heating portion of the rotor core 11.

Accordingly, in the embodiment, since the refrigerant also flows only through the d-axis through-holes 26 of the rotor core 11 when poured into the left hollow shaft portion 15a, the permanent magnets 12 and the rotor core 11 are cooled by a limited amount of refrigerant further effectively. Consequently, the temperature increase in the permanent magnets 12 is suppressed and demagnetization of the permanent magnets 12 is prevented, whereupon reduction in the developed torque can be avoided.

Figure 26:
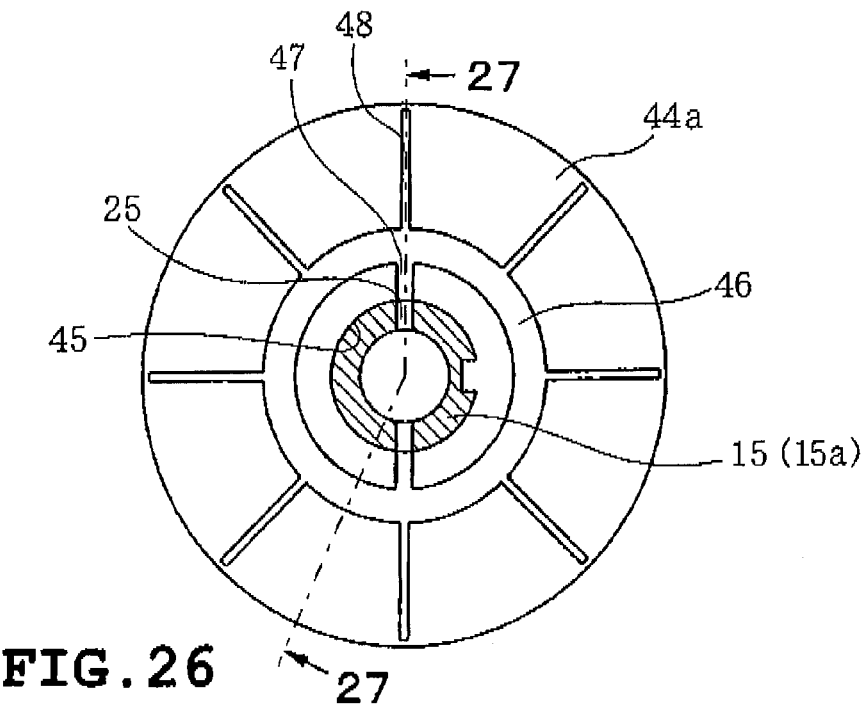
FIG. 26 is a view similar to FIG. 4B, showing the rotor 5 of a twelfth embodiment.
Figure 27:
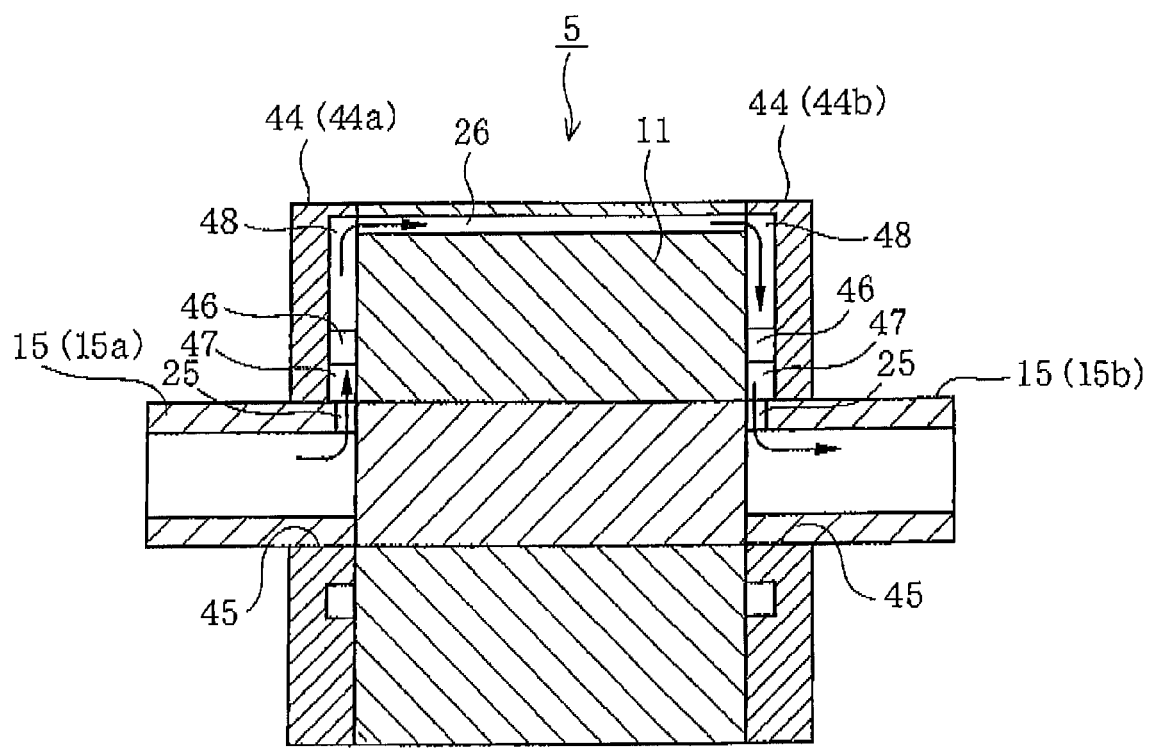
FIG. 27 is a view similar to FIG. 5, showing the rotor 5 of the twelfth embodiment.

The rotor of a twelfth embodiment of the invention will now be described with reference to FIGS. 26 and 27 (a section taken along line 27-27 in FIG. 26). In these figures, identical or similar parts are labeled by the same reference symbols as those in FIG. 5 of the first embodiment. FIG. 26 is a view of an auxiliary plate 44a as viewed from the rotor core 11 side. The figure also shows the section of the rotating shaft 15 running through the shown portions of the rotor core 11.

The rotor 5 of the embodiment differs from the rotor 5 of the first embodiment in the provision of presser plates 44a and 44b provided on both axial end faces of the rotor core 11, instead of the presser plates 14a and 14b. The presser plates 44a and 44b have the same outer diameter as the presser plates 14a and 14b and are centrally formed with fitting holes 45 through which the rotating shaft 15 is inserted thereby to be fixed. The presser plates 44a and 44b have the same shape with an exception that the fitting hole 45 is symmetrical about the rotor core 11. Annularly recessed entry portions 46 are formed in faces of the presser plates 44a and 44b abutting against the rotor core 11. The fitting holes 45 and the entry portions 46 are connected together only by a pair of communication channels 47 disposed at upper and lower positions so as to be opposed on a circumference. Furthermore, eight narrow grooves 48 are formed in side faces abutting against the rotor core 11 so as to radially extend outward from outer edges of the entry portions. The grooves 48 are formed in an outer circumferential edge equiangularly. Since the presser plates 44a and 44b are disposed on both end faces of the rotor core 11 respectively, the narrow grooves 48 extend so as to be opposed between the voids 23a of the rotor core 11 (bridge 24). Accordingly, the hollow shaft portions 15a and 15b of rotating shaft 15 communicate with only the d-axis through-holes 26 through the hollow shaft wall hole 25, communication channels 47, entry portions 46 and narrow grooves 48.

Accordingly, in the embodiment, since the refrigerant also flows only through the d-axis through-holes 26 of the rotor core 11 when poured into the left hollow shaft portion 15a, the permanent magnets 12 and the rotor core 11 are cooled by a limited amount of refrigerant further effectively. Consequently, the temperature increase in the permanent magnets 12 is suppressed and demagnetization of the permanent magnets 12 is prevented, whereupon reduction in the developed torque can be avoided.

Furthermore, as in the eleventh embodiment, the voids 23a and 23b and the q-axis through-holes 27 formed in the rotor core 11 may be sealed by a synthetic resin material or the like so that the refrigerant poured into the hollow shaft portion 15a is prevented from flowing therethrough, instead of the interposition of the auxiliary plates 41a and 41b between both axial end faces of the rotor core 11 and the left and right presser plates 14a and 14b as in the eleventh embodiment or the provision of the presser plates 44a and 44b on both axial end faces of the rotor core 11 as in the twelfth embodiment.

Figure 28:
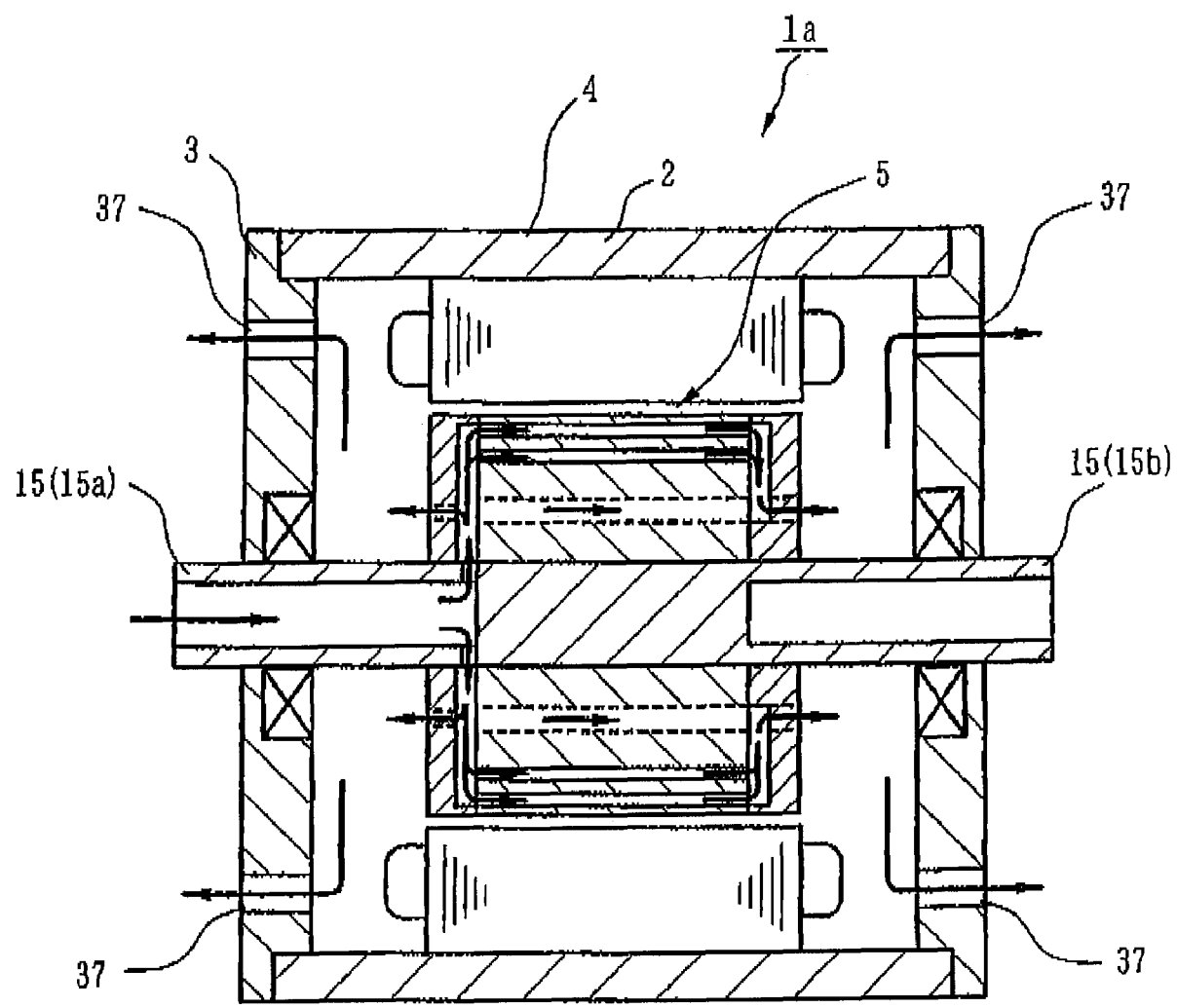
FIG. 28 is a view explaining flow channels in the case where a refrigerant is caused to flow through the rotor 5 in the seventh embodiment.

FIG. 28 shows an example of the construction of a rotating machine 1a employing the rotor 5 of the seventh embodiment as shown in FIG. 16. The refrigerant poured into the left hollow shaft portion 15a of the rotating shaft 15 flows in the rotor core 11, thereafter flowing out of presser plate refrigerant outlet holes 35 provided in the left and right presser plates 14a and 14b, as described above. Accordingly, case refrigerant outlet holes 37 are provided in the left and right bearing brackets 3 in the electric rotating machine 1a of FIG. 28 in order that the refrigerant flowing out of the presser plate refrigerant outlet holes 35 may be caused to flow out of the electric rotating machine 1a.

When poured into the left hollow shaft portion 15a of the rotating shaft 15 in the electric rotating machine 1a, the refrigerant is discharged from the rotor 5 through four types of through holes, that is, the d-axis through-holes 26, voids 23a, voids 23b and q-axis through-holes 27 in the rotor core 11, Accordingly, the permanent magnets 12 and the rotor core 11 are cooled effectively as in the seventh embodiment. Furthermore, the refrigerant discharged from the rotor 5 fills an electric rotating machine case comprising the frame 2 and the right and left brackets 3 and is thereafter discharged through the case refrigerant outlet holes 37 outside the electric rotating machine 1a. Thus, the stator 4 fitted in the frame 2 is also cooled by the refrigerant.

Modified Forms

The invention should not be limited to the above-described embodiments, but the embodiments may be modified as follows:

(1) FIG. 28 shows the electric rotating machine employing the rotor 5 of the seventh embodiment as shown in FIG. 16. However, as the rotor may be employed the rotor of the fifth embodiment as shown in FIG. 12, the rotor of the sixth embodiment as shown in FIG. 14, the rotor of the eighth embodiment as shown in FIG. 18, the rotor of the ninth embodiment as shown in FIG. 20 or the rotor of the tenth embodiment as shown in FIG. 22. Each case can achieve the same effect as from the embodiment of FIG. 28.

(2) The left and right presser plate refrigerant outlet holes 35 provided in the left and right presser plates 14a and 14b have different diameters in the sixth to tenth embodiments. One of purposes of this construction is to substantially equalize amounts of refrigerant flowing out of the presser plate refrigerant outlet holes 35 of the left and right presser plates 14a and 14b in consideration of resistance of channel through which the refrigerant flows. However, the holes 35 may have the same diameter without the consideration. The same effect as from each embodiment can also be achieved from this case.

INDUSTRIAL APPLICABILITY

The rotor for electric rotating machine and the electric rotating machine of the invention are applicable to general machines, machine tools, vehicles, boats and ships and the like.

The invention claimed is:
1. A rotor for an electric rotating machine, comprising:
a plurality of permanent magnets embedded in a plurality of magnet insertion holes axially extending through a circumference of a cylindrical rotor core respectively, each permanent magnet embedded in the magnet insertion hole having both lengthwise ends of a section thereof, said lengthwise ends having respective voids formed by expanding the magnetic insertion hole so that the voids extend axially through the rotor core;
a rotating shaft which extends through a central portion of the rotor core thereby to be fixed;
a plurality of d-axis through holes that is provided on respective d-axes corresponding to a direction of magnetic flux so as to extend through the rotor core in an axial direction in an outer circumferential side relative to the embedded permanent magnets;
a plurality of hollow shafts which is formed in both axial sides of the rotating shaft not inserted into the rotor core, the hollow shafts having hollow shaft wall holes formed in hollow shaft walls of the hollow shafts at both sides of the rotating shaft so as to radially extend through the hollow shafts respectively;

a plurality of presser plates which is mounted on both axial ends of the rotor core so as to hold the rotor core therebetween;

a plurality of cooling grooves which is formed in faces of the presser plates in contact with the rotor core so as to connect the hollow shaft wall holes, the d-axis through holes and the voids respectively, the cooling grooves including first annular grooves provided in the respective presser plates and connecting the respective d-axis through holes and second annular grooves provided in the respective presser plates and connecting the respective voids, and radial grooves provided in the respective presser plates and connecting the first and second annular grooves and the hollow shaft wall holes;

a plurality of presser plate refrigerant outlet holes formed in the presser plates, the presser plate refrigerant outlet holes of one of the presser plates having diameters different from diameters of the presser plate refrigerant outlet holes of one of the other presser plates; and a refrigerant channel which is formed so that a refrigerant supplied into one of the hollow shafts of the rotating shaft flows through the refrigerant channel and further through the hollow shaft wall hole of said one hollow shaft and the radial grooves of the respective presser plates, into a flow path including the first annular grooves of the presser plate, the d-axis through holes of the rotor core and the first annular grooves of the oppositely located presser plate and into a flow path including the second annular grooves of the presser plate, the voids of the rotor core and second annular grooves of the oppositely located presser plate, the refrigerant flowing into the radial grooves of the respective presser plates including part thereof discharged through the refrigerant outlet holes of said one of the presser plates and a remaining part thereof discharged through the refrigerant outlet holes of said other presser plate.

2. The electric rotating machine rotor according to claim 1, wherein:

fourth annular grooves are formed in both presser plates so as to be located inward relative to the other annular grooves provided in both presser plates;

each fourth annular groove has a plurality of presser plate refrigerant outlet holes formed equiangularly and communicating with an axial outside; and the radial groove formed in the presser plate located at the refrigerant inlet side is formed so as to connect all the annular grooves formed in the presser plate to the hollow shaft walls of the rotating shaft, and the radial groove of the oppositely located presser plate is formed so as to connect only all the annular grooves formed in said presser plate to one another.

3. The electric rotating machine rotor according to claim 1, further comprising:

a q-axis through hole provided on a q-axis so as to axially extend through the rotor core, the q-axis being out of phase with the d-axis by $\pi/2$ by electrical angle; and third annular grooves formed in surfaces of both presser plates in contact with the rotor core so as to connect the q-axis through hole, respectively, wherein the radial grooves of the presser plates are formed so as to connect the third annular grooves to the hollow shaft wall holes of the rotating shaft as well as the first and second annular grooves, whereupon the refrigerant channel is formed so that the refrigerant is caused to flow through the q-axis through hole in addition to the d-axis through holes and the voids.

4. The electric rotating machine rotor according to claim 3, wherein the third annular grooves of both presser plates are formed with a plurality of presser plate refrigerant outlet holes communicating with an axial outside and formed equiangularly, and the radial groove formed in the opposite presser plate of the rotor core is formed so as to connect only the first, second and third annular grooves to one another.

5. The electric rotating machine rotor according to claim 3, wherein an overall part of the rotating shaft is formed as the hollow shaft.

6. The electric rotating machine rotor according to claim 3, wherein the rotating shaft includes a part which is formed as the hollow shaft and extends from an end thereof located at the refrigerant inlet side and communicates with the hollow shaft wall hole, the rotating shaft including the other part formed as a solid shaft.

7. The electric rotating machine rotor according to claim 3, wherein:

each magnet insertion hole in which the permanent magnet producing the d-axis magnetic flux is embedded is divided at a center thereof along the d-axis into two parts;

a bridge connecting a circumference of the rotor core and a side of the rotating shaft is formed between the parts of each magnet insertion hole;

the divided parts of each permanent magnet are disposed into a V shape as viewed at the rotating shaft side; and the permanent magnet is embedded in each magnet insertion hole.

8. An electric rotating machine in which a stator serves as an armature and a rotor in which permanent magnets are embedded serves as a field system, wherein the rotating machine rotor claimed in claim 3 is used as the rotor, and wherein a refrigerant is caused to flow through the refrigerant channel of the rotor.

9. An electric rotating machine in which a stator serves as an armature and a rotor in which permanent magnets are embedded serves as a field system, wherein the rotating machine rotor claimed in claim 1 is used as the rotor, and wherein a case refrigerant outlet hole is formed in a case housing the rotor and a stator so that the refrigerant flowing out of the presser plate refrigerant outlet hole is caused to flow out of the case therethrough.

* * * * *